United States Patent
Toyotake et al.

(10) Patent No.: US 9,482,302 B2
(45) Date of Patent: Nov. 1, 2016

(54) PROCESS FOR MANUFACTURING SEAMLESS STEEL PIPE, HOLLOW SPRING UTILIZING SEAMLESS STEEL PIPE

(71) Applicants: Shinko Metal Products Co., Ltd., Kitakyusyu-shi, Fukuoka (JP); NHK Spring Co., Ltd., Yokohama-shi, Kanagawa (JP)

(72) Inventors: Kotaro Toyotake, Tokyo (JP); Koji Iwaya, Kitakyushu (JP); Tomoyuki Minami, Kitakyushu (JP); Noritoshi Takamura, Kanagawa (JP)

(73) Assignees: SHINKO METAL PRODUCTS CO., LTD., Fukuoka (JP); NHK SPRING CO., LTD., Kanagawa (JP)

(*) Notice: Subject to any disclaimer, the term of this patent is extended or adjusted under 35 U.S.C. 154(b) by 482 days.

(21) Appl. No.: 13/892,009

(22) Filed: May 10, 2013

(65) Prior Publication Data
US 2013/0239637 A1    Sep. 19, 2013

Related U.S. Application Data

(62) Division of application No. 12/530,709, filed as application No. PCT/JP2007/055133 on Mar. 14, 2007, now abandoned.

(51) Int. Cl.
*B21B 19/04* (2006.01)
*F16F 1/04* (2006.01)
*B21C 23/00* (2006.01)
*B21C 23/08* (2006.01)
*B21F 3/02* (2006.01)
(Continued)

(52) U.S. Cl.
CPC .............. *F16F 1/042* (2013.01); *B21B 19/04* (2013.01); *B21C 23/007* (2013.01); *B21C 23/08* (2013.01);
(Continued)

(58) Field of Classification Search
CPC ...................................................... B21B 47/00
USPC ............................................................ 148/593
See application file for complete search history.

(56) References Cited

U.S. PATENT DOCUMENTS 4,036,043 A    7/1977   Yamaguchi et al.
4,445,350 A    5/1984   Nishihara et al.
(Continued)

FOREIGN PATENT DOCUMENTS

FR    2 200 107     4/1974
GB    1 448 277     9/1976
(Continued)

OTHER PUBLICATIONS

F. Kraft and J.S. Gunasekera, Conventional Hot Extrusion, Metalworking: Bulk Forming, vol. 14A, ASM Handbook, ASM International, 2005, p. 421-439 (excerpted from ASM Handbooks Online).*

(Continued)

*Primary Examiner* — Jessee Roe
*Assistant Examiner* — Christopher Kessler
(74) *Attorney, Agent, or Firm* — Merchant & Gould P.C.

(57) ABSTRACT

There are provided: a seamless steel pipe formed from a cylindrical steel material billet through a hot isostatic extrusion step, wherein a depth of a contiguous flaw formed on an inner periphery surface and an outer periphery surface of the steel pipe is 50 μm or less; a hollow spring obtained by forming a hollow body in a shape of a coil or a bar or a bar with curved part from the seamless steel pipe made of spring steel and applying a surface treatment to the hollow body so that the hollow body has compressive residual stress; and a method for producing seamless steel pipe including: a billet molding step; a first heating step; a hot isostatic extrusion step; a second heating step; an extension step; a third heating step; and a pickling step.

13 Claims, 11 Drawing Sheets

(51) Int. Cl.
  *C21D 9/08* (2006.01)
  *C22C 38/04* (2006.01)
  *C22C 38/34* (2006.01)
  *C22C 38/46* (2006.01)
  *F16F 1/06* (2006.01)
  *F16F 1/18* (2006.01)
  *B21B 1/42* (2006.01)

(52) U.S. Cl.
  CPC ............... *B21C 23/085* (2013.01); *B21F 3/02* (2013.01); *C21D 9/08* (2013.01); *C22C 38/04* (2013.01); *C22C 38/34* (2013.01); *C22C 38/46* (2013.01); *F16F 1/04* (2013.01); *F16F 1/06* (2013.01); *F16F 1/18* (2013.01); *B21B 1/42* (2013.01)

(56) References Cited

U.S. PATENT DOCUMENTS

| | | | |
|---|---|---|---|
| 5,405,459 | A | 4/1995 | Miyamoto et al. |
| 6,562,484 | B2 | 5/2003 | Usui et al. |
| 2005/0191509 | A1* | 9/2005 | Nakashima et al. .......... 428/610 |

FOREIGN PATENT DOCUMENTS

| | | |
|---|---|---|
| JP | 1-247532 | 10/1989 |
| JP | 6-63613 | 3/1994 |
| JP | 7-39908 | 2/1995 |
| JP | 07-266837 | 10/1995 |
| JP | 10-286617 | 10/1998 |
| JP | 2003-62604 | 3/2003 |
| JP | 2004-346402 | 12/2004 |
| JP | 2005-2365 | 1/2005 |

OTHER PUBLICATIONS

Nishihara. "Nekkan Seisuiatsu Oshidashi Kako." *Sosei to Kako*. vol. 28. No. 319. 1987. No Translation.

The Iron and Steel Institute of Japan. "Waga Kuni ni Okeru Saikin no Kokan Seizo Gijutsu no Shinpo." 1974. pp. 293, 306, 322. No Translation.

Machine translation of JP 2004-346402 A (Japanese document published on Dec. 9, 2004).

European Search Report for corresponding EP Application No. 07738603.5 dated Jan. 29, 2014.

* cited by examiner (a)

(b)

(c)

PROCESS FOR MANUFACTURING SEAMLESS STEEL PIPE, HOLLOW SPRING UTILIZING SEAMLESS STEEL PIPE

This application is a Divisional of U.S. Ser. No. 12/530,709, filed 10 Sep. 2009, now abandoned, which is a National Stage Application of PCT/JP2007/055133, filed 14 Mar. 2007 and which applications are incorporated herein by reference. To the extent appropriate, a claim of priority is made to each of the above disclosed applications.

TECHNICAL FIELD

The present invention relates to a cylindrical seamless steel pipe, to be used as a material for coiled spring and the like, and a method for producing the same.

BACKGROUND ART

Recently in automobile field, techniques of weight reduction have been developed: panels are more likely to be made of aluminum, and chassis and main bodies are improved to have high-tensile strength. Demand for weight reduction is now increasing in the current situation where international awareness of global warming caused by emission from vehicle becomes stronger, and reduction of $CO_2$ contained in exhaust gas became a big issue.

In the automobile field, techniques for reducing $CO_2$ have been studied mainly towards the following two directions: a development of new power sources, such as hybrid engine, fuel cell motor system and battery motor system; and an improvement of existing engines.

Major techniques for improving existing engines include "improvement of combustion method" and "energy-saving of power source by weight reduction". Especially in Europe, a new fuel regulation will be introduced in 2010, and in order to comply with this regulation, automobile companies are engaged in developments of immediate weight reduction of whole car body.

These demands also include weight reduction of springs used in the car. For example, Patent Document 1 discloses a method for producing steel pipe having no seam (which corresponds to "seamless steel pipe" of the present invention) for springs in which a spring steel material is heated and subjected to Mannesmann-piercing, and then to mandrel mill rolling to thereby obtain a hollow raw pipe, which is then subjected to finish rolling.

Patent Document 1: Japanese unexamined patent application laid-open specification, No. H1-247532

However, in the method for producing seamless steel pipe in which Mannesmann-piercing is performed, there is a limitation on a minimum diameter of the rolling. For example, when a seamless steel pipe having a diameter of approximately 10 mm is produced from a hollow raw pipe, a multiple number of drawing steps and heating steps should be performed.

Especially when the material is a spring steel, which has a high hot deformation resistance, a section reduction per drawing should be considerably low as compared with general mild steel and the like, such as 20% (which specifically means that a pipe diameter of 100 mm² becomes 80 mm²) Therefore, in the production method according to the above-mentioned patent document, there arises a problem that production efficiency becomes extremely poor.

Further, on a surface of the seamless steel pipe produced by the production method disclosed in the above-mentioned patent document, decarburization and rolling patterns may occur due to repeated hot processing, and there arises a necessity to peel (grind) an outer periphery surface and an inner periphery surface of the seamless steel pipe. Grinding may result in generation of flaws, especially in the inner periphery surface of the seamless steel pipe.

In addition, in the production method disclosed in the above-mentioned patent document, the seamless steel pipe is produced by Mannesmann-piercing, and when a material with high hardness is used, tools may frequently be damaged. Therefore, there was a problem that only a material with low hardness can be used, and thus only a seamless steel pipe with low endurance can be produced.

On the other hand, there is a method for producing seamless steel pipe by repeating heat treatment and press working. However, such a method is extremely poor in processing efficiency when producing a seamless steel pipe having a small diameter of, for example, approximately 10 mm, and thus feasibility is extremely low.

Though the above-mentioned patent document and the like proposed a production of seamless steel pipe, a seamless steel pipe having high hardness and a small diameter has not been produced in practice, due to the above-mentioned problems.

In a case of a hollow spring made of the conventional seamless steel pipe, there are disadvantages that a design stress should be made low and weight reduction effect is low, since a material strength of the seamless steel pipe itself is low and permanent transformation (permanent set) and fracture of the spring may occur under high stress.

DISCLOSURE OF INVENTION

Technical Problem

The present invention was made in view of the aforementioned problems, and an object is to provide a seamless steel pipe with high endurance and hollow spring made of the seamless steel pipe, and a method for producing the seamless steel pipe with excellent production efficiency, with high quality at a reduced cost.

A seamless pipe according to the present invention having solved the aforementioned problems is a seamless steel pipe formed from a cylindrical steel material billet through a hot isostatic extrusion step, wherein a depth of a contiguous flaw formed on an inner periphery surface and an outer periphery surface of the steel pipe is 50 μm or less.

Since the depth of the contiguous flaws formed on the outer periphery surface and the inner periphery surface during extrusion are made very small, such as 50 μm or less from the surface (of the inner periphery or the outer periphery) of the steel pipe, a seamless steel pipe can be obtained in which there can be eliminated most parts that would otherwise become origin for fracture when the seamless steel pipe as a spring is continuously extended and contracted.

The seamless steel pipe of the present invention may have a metallographic structure containing non-metallic inclusions, and a maximum thickness of the non-metallic inclusion in a direction perpendicular to a pipe axis is 50 μm or less.

Since the maximum thickness of the non-metallic inclusion in a direction perpendicular to the axis of the seamless steel pipe is remarkably small, such as 50 μm or less, there can be further eliminated parts that would otherwise become origin for fracture when the seamless steel pipe as a spring is continuously extended and contracted.

In the present invention, the term "non-metallic inclusion" means, for example, glass-like inclusion, such as $CaO$—$SiO_2$—$Al_2O_3$.

In the seamless steel pipe of the present invention, an average roughness Ra of the inner periphery surface and the outer periphery surface of the steel pipe may be 12.5 μm or less.

Since in the seamless steel pipe of the present invention, the surface is made very smooth, such as the average roughness Ra of at least one of the inner periphery surface and the outer periphery surface is made 12.5 μm or less, there can be further eliminated parts that would otherwise become origin for fracture, when the seamless steel pipe as a spring is continuously extended and contracted.

In the seamless steel pipe of the present invention, the steel material may be spring steel.

Due to an introduction of a hot isostatic extrusion step, the spring steel can be used for a seamless steel pipe having a high hardness, though in the conventional seamless steel pipe, it was impossible to use the spring steel as a steel material.

The hollow spring made of the seamless steel pipe of the present invention in its primary characteristic is obtained by: extruding a heated spring steel material under hot isostatic pressure, to thereby obtain a seamless spring steel pipe with enhanced material cleanliness and surface properties; processing the seamless spring steel pipe into a hollow body in a shape of a coil or a bar or a bar with curved part, and then applying a surface treatment to the hollow body so that the hollow body has compressive residual stress. With this hollow spring, both weight reduction effect and fatigue strength enhancement can be attained.

In another aspect of the present invention, there is provided a method for producing seamless steel pipe which includes a billet molding step, a first heating step, a hot isostatic extrusion step, a second heating step, an extension step, a third heating step and pickling step.

In the method for producing seamless steel pipe of the present invention, a steel material is molded into a cylindrical billet in the billet molding step, the billet is heated in the first heating step, to thereby prepare for hot isostatic extrusion processing in a next step, and the heated billet is subjected to hot isostatic extrusion processing in the hot isostatic extrusion step, to thereby obtain a seamless steel pipe workpiece. Since the hot isostatic extrusion processing is performed here, the seamless steel pipe workpiece can be made with almost no contiguous flaw that may otherwise be formed by slidable contact with the hot isostatic extruder. Further in this production method, in the second heating step, the seamless steel pipe workpiece is heated into moldable state, and in the extension step, the seamless steel pipe workpiece is extended by at least one of Pilger mill rolling and drawing processing. In order to prevent work hardening, in the third heating step, the extended seamless steel pipe workpiece is heated, and in the pickling step, the extended and heated seamless steel pipe workpiece is pickled (washed), to thereby produce a seamless steel pipe having smooth outer and inner peripheries.

That is, for example, in a case where a relatively thin and long seamless steel pipe is produced, production cost can be reduced since Mannesmann-piercing or mandrel mill rolling is not necessary, and thus such a seamless steel pipe can be produced with excellent production efficiency at a reduced cost. Since the hot isostatic extrusion processing is performed that attains smooth outer periphery surface and inner periphery surface, a seamless steel pipe with excellent quality can be produced.

The method for producing seamless steel pipe of the present invention may further include a straightening step in which bend of the pickled seamless steel pipe is straightened, after the pickling step.

When a coiled spring and the like is produced using the seamless steel pipe, local generation of abnormal stress can be prevented by straightening the bend, and thus the product with excellent endurance can be produced.

The method for producing seamless steel pipe according to the present invention may further include a grinding step in which an inner periphery surface of the heated seamless steel pipe workpiece is subjected to grinding processing, after the second heating step.

In the method for producing seamless steel pipe according to the present invention, an inner periphery surface of the seamless steel pipe may be ground after the straightening step.

Since a decarburized layer generated by the heat treatment is ground to thereby remove unquenched parts and uniformize surface hardness, the seamless steel pipe with excellent endurance and high dependability can be produced.

In the method for producing seamless steel pipe of the present invention, a temperature of the hot isostatic extrusion may be 1,050° C. or more and less than 1,300° C.

Since the hot isostatic extrusion temperature is defined in a specific range, a maximum size and a number per unit area of non-metallic inclusions can be appropriately controlled, and the seamless steel pipe with excellent endurance can be produced.

In the method for producing seamless steel pipe of the present invention, a slow-cooling step may be performed in which the seamless steel pipe workpiece that had been subjected to the hot isostatic extrusion processing is slowly cooled, instead of the second heating step.

Since carbide in the metallographic structure can be granulated by, instead of the second heating step, slowly cooling the seamless steel pipe workpiece that had been subjected to the hot isostatic extrusion processing, the seamless steel pipe having enhanced cold-workability, grindability (machinability), fracture toughness, as well as excellent endurance as described above, can be produced.

Advantageous Effects

The seamless steel pipe of the present invention has smooth outer periphery surface and inner periphery surface, since it is produced by hot isostatic extrusion processing. Therefore, there can be eliminated most parts that would otherwise become origin for fracture when the seamless steel pipe as a spring is continuously extended and contracted, and as a result, the seamless steel pipe exhibits excellent endurance, such as a long fatigue life.

In addition, in the seamless steel pipe of the present invention, weight reduction by approximately 30 to 40% can be attained as compared with a solid-core steel material having the same diameter.

The hollow spring of the present invention is obtained first as a seamless steel pipe with enhanced material cleanliness and surface properties by extruding a heated spring steel material with fluid pressure; and then as a hollow body in a shape of a coil or a bar or a bar with curved part from the seamless spring steel pipe by applying a surface treatment to the seamless spring steel pipe so that the seamless spring steel pipe has compressive residual stress. In the resultant coiled spring, a material strength of the hollow spring becomes high, which in turn suppresses permanent transformation (permanent set) and fracture of the spring even under high stress, and design stress can be made higher, to thereby obtain both weight reduction effect and raise of fatigue strength.

Effects of the present invention when applied to some automobile parts will be described below.

First, for enhancing engine performance, one technique is to improve output properties, including an increase of an engine revolution limit and a modification of a breathing port. With respect to the engine revolution limit, a movement of a valve operating system becomes a main factor that determines the limit. A rotational movement of a crankshaft transmitted through a cam is transformed into an up-and-down movement of the valve, and the up-and-down movement of the valve is pressed back by a valve spring. Therefore, the engine revolution limit is defined as a point at which the up-and-down movement of the valve spring cannot follow the rotational movement of the cam. In order to improve performance, it is necessary to increase spring load or reduce inertial mass of a reciprocally moving part, such as the valve including the spring. In order to meet this requirement, it is preferable to reduce a weight of the spring itself, to make the spring compact, and further, to maintain and improve spring load (for example, if a weight of the spring is reduced, a characteristic frequency of the valve spring increases, and accordingly, the engine revolution limit increases).

Due to the reduction of the inertial mass of the valve spring, a large improvement effect in fuel consumption is obtained. In general, an improvement of approximately 0.5 to 1.0% fuel consumption for every 20% reduction of the spring mass is obtained.

Next, a suspension spring of automobile suspension is a major factor affecting running performance including on-board comfortability and cornering, and thus merchantability of the automobile. The suspension performance relies chiefly on a basic structure of the veto hide, properties of suspension itself including the suspension spring, and an unsprung weight of tire parts. The suspension spring used for suspending the automobile is designed to sustain a large load since it should support the entire weight of the vehicle, and thus the spring itself has a large weight. Therefore, if the weight of the suspension spring can be reduced, like the valve spring of the engine, the unsprung weight can be also reduced. For example, weight reduction effect of the unsprung weight is ten times larger than body weight reduction effect. Further, the whole structure can be made smaller, leading to not only better on-board comfortability, but also possibility to apply new structural parts.

According to the method for producing seamless steel pipe of the present invention, a seamless steel pipe is easily produced by hot isostatic extrusion processing, without piercing the pipe, and thus the number of steps can be reduced. As a result, the seamless steel pipe can be produced with enhanced production efficiency at a reduced cost.

In addition, according to the method for producing seamless steel pipe of the present invention, hot isostatic extrusion processing is performed, and therefore, the seamless steel pipe with high quality having smooth outer periphery surface and inner periphery surface can be produced.

Further, according to the method for producing seamless steel pipe of the present invention, the seamless steel pipe can be easily produced, since Mannesmann-piercing or mandrel mill rolling are not performed.

BEST MODE FOR CARRYING OUT THE INVENTION

The seamless steel pipe, the hollow coiled spring made of the seamless steel pipe, and the method for producing the same of the present invention will be explained below in detail, with reference to the accompanying drawings.

[1. Seamless Steel Pipe]

Figure 1:
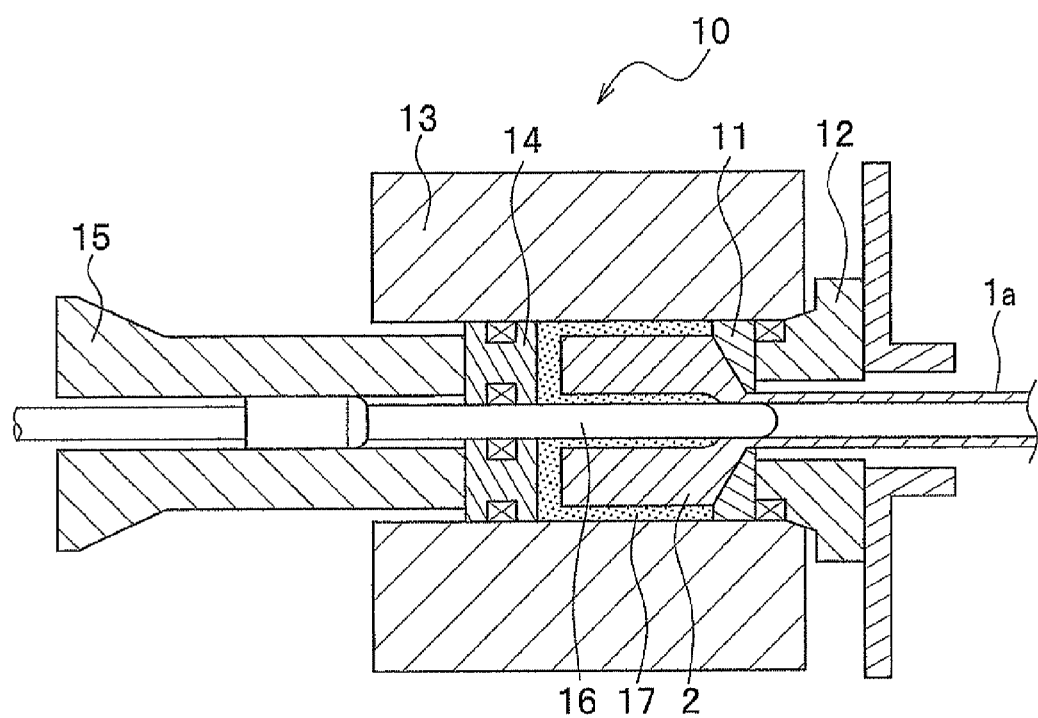
FIG. 1 is an enlarged sectional view of a main part of a hot isostatic extruder to be used in a production of a seamless steel pipe according to the present invention.

Referring to FIG. 1, a seamless steel pipe according to the present invention will be described in detail below. FIG. 1 is an enlarged sectional view of a main part of a hot isostatic extruder to be used in production of a seamless steel pipe according to the present invention.

A seamless steel pipe 1 according to the present invention can be produced at least through a hot isostatic extrusion step in which a billet 2 as a cylindrical steel material is subjected to hot isostatic extrusion processing and a seamless steel pipe workpiece 1a is formed, as shown in FIG. 1.

The seamless steel pipe 1 can be provided with a remarkably smooth surface (outer periphery surface and inner periphery surface) even from a stage of hot processing, since hot isostatic extrusion processing is performed in a hot isostatic extrusion step.

In the hot isostatic extrusion processing, a viscoplastic pressure medium 17 is used when the seamless steel pipe workpiece 1a is extruded with a hot isostatic extruder 10. Therefore, friction between the hot isostatic extruder 10 and the seamless steel pipe workpiece 1a can be remarkably reduced even when a large pressure of, for example, approximately 1 GPa (10,000 atm), is applied and as a result, the seamless steel pipe 1 can be produced that has excellent surface properties with no contiguous flaw or surface roughness.

For the pressure medium 17, a lubricant prepared by adding graphite to oil is preferred.

In the seamless steel pipe 1, a depth of the contiguous flaw formed on the inner periphery surface or the outer periphery surface thereof is 50 µm or less from the surface.

The term "contiguous flaw" herein means a long scratching flaw continuously formed on the outer periphery surface or the inner periphery surface of the seamless steel pipe 1 from one terminal side to the other terminal side, due to, for example, a contact with a part of the hot isostatic extruder during a production of the seamless steel pipe 1.

For example, when continuous extension and contraction of a coiled spring made of the seamless steel pipe result in cracks or fracture of the coiled spring, the cause generally lies in surface abnormality, such as contiguous flaw formed on the surface of the coiled spring, or a presence of non-metallic inclusions.

Therefore in the present invention, the depth of the contiguous flaw is made 50 μm or less, preferably 45 μm or less, more preferably 40 μm or less, still more preferably 38 μm or less, further preferably 35 μm or less, from the surface of the outer periphery surface or the inner periphery surface. With this configuration, most parts that would otherwise become origin for fracture can be eliminated.

The depth of the contiguous flaw exceeding 50 μm from the surface of the outer periphery surface or the inner periphery surface is not preferable, since a crack or fracture may start from the contiguous flaw when the coiled spring is continuously extended and contracted.

In addition, with respect to the surface roughness of the outer periphery surface and the inner periphery surface of the seamless steel pipe 1, use of the hot isostatic extruder 10 makes it possible to retain an average roughness Ra low, such as 12.5 μm or less.

The average roughness Ra exceeding 12.5 μm is not preferable, since such an excessive surface roughness will generate parts that may become origin for cracks or fracture when the coiled spring is continuously extended and contracted. It should be noted that a lower average roughness Ra is more preferable. The average roughness Ra is preferably 12 μm or less, more preferably 10 μm or less, still more preferably 8 μm or less, further more preferably 4 μm or less, though, there is no lower limit.

The surface roughness Ra is preferably defined by measuring a roughness in a pipe axis direction on the inner periphery surface and the outer periphery surface of the seamless steel pipe.

As shown in FIG. 1, the hot isostatic extruder 10 has: a container 13 having a die 11 at a front end thereof with a support member 12; a sealing piston 14 disposed in the container 13; a stem 15 for pressing the sealing piston 14; and a mandrel 16 penetrating the sealing piston 14 and the stem 15, for forming an inner bore of a seamless steel pipe workpiece 1a.

This seamless steel pipe workpiece 1a becomes the seamless steel pipe 1 through steps which will be described later.

In the hot isostatic extruder 10, the billet 2 heated to a high temperature (e.g., 1,050° C. or more and less than 1,300° C.) and softened in advance is put in the container 13, the billet 2 is pressed by the sealing piston 14 through a pressure medium 17, and the billet 2 is discharged from a space between the die 11 and the mandrel 16, to thereby obtain the seamless steel pipe workpiece 1a.

Specifically, for example, the seamless steel pipe 1 having an outer diameter of 30 to 60 mm and a steel thickness of 4 to 7 mm can be easily produced by extruding the billet 2 made of a hollow steel material having an inner diameter of 50 to 60 mm and an outer diameter of 140 to 160 mm, with the hot isostatic extrusion process using the hot isostatic extruder 10.

Of course, the inner diameter and the outer diameter of the billet 2, and the outer diameter and the steel thickness of the seamless steel pipe 1 are not limited to those described above, and can be altered appropriately.

As the steel material to be used for producing the seamless steel pipe 1 of the present invention, there can be mentioned what is called a spring steel, such as SiCr steel, and SiCrV steel with higher strength. Springs in compliance with a standard of JIS G 3560, JIS G 3561 or the like are preferred, and especially preferred examples include KHV12N, KHV10N, KHV6N, KHV7, CRV, HRS6, SRS600, UHS1900 and UHS2000 (manufactured by Kobe Steel Ltd).

For such a steel material, the composition preferably is: C of 0.3 to 1.0 mass %, more preferably 0.5 to 0.7 mass % or less; Si of 0.1 to 3.0 mass %, more preferably 1.0 to 3.0 mass %; Mn of 0.05 to 1.5 mass %, more preferably 0.5 to 1.5 mass %; Ni of 0 to 2.5 mass %, more preferably 0.05 to 0.5 mass %; Cr of 0 to 2.0 mass %, more preferably 0.05 to 1.5 mass %; Mo of 0 to 0.8 mass %; V of 0 to 0.8 mass %, more preferably 0.05 to 0.3 mass %; Ti, Nb, Co and W of 0 to 0.5 mass %; and Fe with unavoidable impurities as the remainder.

(C, 0.3 to 1.0 mass %)

Carbon (C) is a useful element for enhancing tensile strength, improving fatigue property and retaining permanent-transformation resistance of the seamless steel pipe (including seamless steel pipe workpiece).

If the amount of C exceeds 1.0 mass %, susceptibility to defects increases, and a crack may start from a surface flaw or a non-metallic inclusion, leading to shortening of a fatigue life.

On the other hand, if the amount of C is less than 0.3 mass %, tensile strength required as a high-stress spring cannot be secured, and an amount of initial deposition of ferrite that has an effect of generating fatigue crack is increased, leading to deterioration of fatigue property.

Therefore, the amount of C is made 0.3 to 1.0 mass % in the present invention. The C amount of 0.5 to 0.7 mass % or narrower range is more preferable.

(Si: 0.1 to 3.0 mass %)

Silicon (Si) is an element having an effect of enhancing tensile strength, improving fatigue property and improving permanent-transformation resistance of the seamless steel pipe by solid solution reinforcement.

If the amount of Si is less than 0.1 mass %, the above-mentioned effects cannot be obtained.

On the other hand, if Si is excessively present in an amount more than 3.0 mass %, the surface is decarburized and flaws increase, leading to poor resistance to fatigue.

Therefore, the amount of Si in the present invention is made 0.1 to 3.0 mass %. The Si amount of 1.0 to 3.0 mass % is more preferable.

It should be noted that, if the amount of C is made lower, the amount of Si should be set higher by that amount.

(Mn: 0.05 to 1.5 mass %)

Manganese (Mn) is an element having an effect of close packing and ordering of pearlite structure, leading to improvement in fatigue property.

If the amount of Mn is less than 0.05 mass %, the above-mentioned effects cannot be obtained.

On the other hand, if Mn is excessively present in an amount more than 1.5 mass %, bainite structure is easily formed during hot isostatic extrusion or the like, leading to deterioration of fatigue property.

Therefore, the amount of Mn is made 0.05 to 1.5 mass % in the present invention. The Mn amount of 0.5 to 1.5 mass % is more preferable.

(Ni: 0 to 2.5 mass %)

Nickel (Ni) may not be included, but it is preferable to include Ni, since Ni lowers susceptibility to notches and enhances fracture toughness. Ni also has effects of, for example, suppressing fracture in coiling processing, and elongating a fatigue life.

In order to obtain such effects, it is preferable that Ni be contained in an amount of 0.05 mass % or more.

On the other hand, if Ni is excessively present in an amount more than 2.5 mass %, bainite structure is easily formed during hot isostatic extrusion or the like, leading to adverse result.

Therefore, the amount of Ni is made 0 to 2.5 mass % in the present invention. The Ni amount of 0.05 to 0.5 mass % is more preferable.

(Cr: 0 to 2.0 mass %)

Chromium (Cr) may not be included, but it is preferable to include Cr, since gaps between pearlite lamellae can be made smaller, and fracture strength is increased and permanent-transformation resistance is improved after hot isostatic extrusion or after heat treatment.

In order to obtain such effects, it is preferable that Cr be contained in an amount of 0.05 mass % or more.

On the other hand, if Cr is excessively present in an amount more than 2.0 mass %, patenting time becomes too long, and fracture toughness and ductility are deteriorated.

Therefore, the amount of Cr is made 0 to 2.0 mass % in the present invention. The Cr amount of 0.05 to 1.5 mass % is more preferable.

(Mo: 0 to 0.8 mass % or less)

Molybdenum (Mo) may not be included, but may be included since Mo enhances quenching property and has an effect of increasing strength of spring steel.

In order to obtain this effect, it is preferred that Mo be contained in an amount of 0.2 mass % or more.

On the other hand, if an amount of Mo is excessive, fracture toughness and ductility are extremely deteriorated, and thus the Mo amount should be suppressed to 0.8 mass % or less.

Therefore, the amount of Mo in the present invention is made 0 to 0.8 mass % or narrower range.

(V: 0 to 0.8 mass %)

Vanadium (V) may not be included, but it is preferable to include V, since V is useful for fining pearlite nodule size and improving workability of the seamless steel pipe. If V is used as a spring material, V is also useful for improving fracture toughness, permanent-transformation resistance and the like of the spring material.

In order to obtain such effects, it is preferable that V be contained in an amount of 0.05 mass % or more.

If V is excessively present in an amount more than 0.8 mass %, bainite structure is easily formed during hot isostatic extrusion or the like, leading to shortening of a fatigue life.

Therefore, the amount of V is made 0 to 0.8 mass % in the present invention. The V amount of 0.05 to 0.3 mass % is more preferable.

(Unavoidable Impurities)

The essential components of the seamless steel pipe of present invention have been described. The remaining part consists substantially of Fe, but may include other components in a trace amount in such a manner that such components do not suffer properties of the seamless steel pipe made of the steel material as described above. The seamless steel pipe containing unavoidable impurities in such an amount is also included in the scope of the present invention. As the unavoidable impurities, examples include impurities, especially P, S, As, Sb, Sn and the like.

In this manner, the seamless steel pipe 1 of the present invention is made of a spring steel having high hardness. Therefore, though having a hollow structure, the seamless steel pipe 1 has almost the same hardness as those of the conventional solid-core pipe produced using a rolled steel for general structure (JIS G 3101), carbon steel for machine structure (JIS G 4051) and the like.

Even though such a hard steel material is used, a seamless steel pipe can be produced from a seamless steel pipe workpiece through hot isostatic extrusion processing, in other words, the pipe can be produced without such a making method as piercing, and therefore, the production becomes easy and production cost can be reduced. It should be noted that, after hot isostatic extrusion, the pipe can be provided with desired properties by appropriate cold working, heat treatment and the like.

Therefore, the seamless steel pipe 1 of the present invention can become as hard as Vickers hardness (Hv) of 500 or more, which had not been attained in the prior arts. The seamless steel pipe 1 of the present invention can become still as hard as Vickers hardness (Hv) of 550 or more, Hv 600 or more and Hv 650 or more.

In the seamless steel pipe 1 of the present invention, metallographic structure thereof contains non-metallic inclusions and the maximum thickness of the non-metallic inclusion in a direction perpendicular to an axis of the seamless steel pipe is preferably 50 µm or less. It should be noted that, for a member required to have a fatigue life (action of extension and contraction) of more than 10 million times, it is more preferable that the non-metallic inclusions contained therein have the maximum thickness in a direction perpendicular to the axis of the seamless steel pipe of less than 30 µm, and a number of the non-metallic inclusions per 100 $mm^2$ of less than 30.

The maximum thickness of the non-metallic inclusion in a direction perpendicular to the pipe axis that exceeds 50 µm is not preferable since, for example, stress is concentrated on the non-metallic inclusions when the seamless steel pipe suffers cyclic fatigue and the like, which may result in fatigue breakdown. On the other hand, there is no limit for lower bound, since it is preferable that non-metallic inclusions be absent from a viewpoint of improving endurance.

With respect to the non-metallic inclusions, the maximum thickness and the number per 100 $mm^2$ of the metallographic structure can be measured by conventional techniques, such as observation of a cross section with a scanning electron microscope.

As described above, in the seamless steel pipe 1 of the present invention, fracture does not occur that may otherwise occur when the seamless steel pipe 1 as a spring is continuously extended and contracted, by appropriately controlling the depth of the contiguous flaw, the maximum length, the maximum thickness and the number of the non-metallic inclusion included in the metallographic structure per unit area, the ranges of the components, and the average roughness Ra of the inner periphery surface and the outer periphery surface, and therefore, the seamless steel pipe 1 exhibits excellent endurance. In addition, the seamless steel pipe 1 of the present invention can have a higher hardness than the conventional seamless steel pipes.

In addition, since the seamless steel pipe 1 is hollow, 30 to 40% of weight reduction is attained as compared with a solid-core material. This weight reduction is almost equivalent to that attained by β titanium alloy used for vehicle parts.

[2. Hollow Spring]

The seamless steel pipe 1 of the present invention is suitable as a material for hollow spring, such as a compression coil hollow spring, a tension coil hollow spring and a torsion hollow spring. Especially, as described above, when the seamless steel pipe 1 is made of a steel material (e.g. spring steel) with high hardness and a hollow spring is formed of the seamless steel pipe 1, the resultant compression coil hollow spring has a large spring constant. Specifically, for example, the hollow spring can be used as a valve spring, suspension spring and the like. As compared with the conventional solid-core valve springs or suspension springs, 30 to 40% of weight reduction can be attained.

Figure 2:
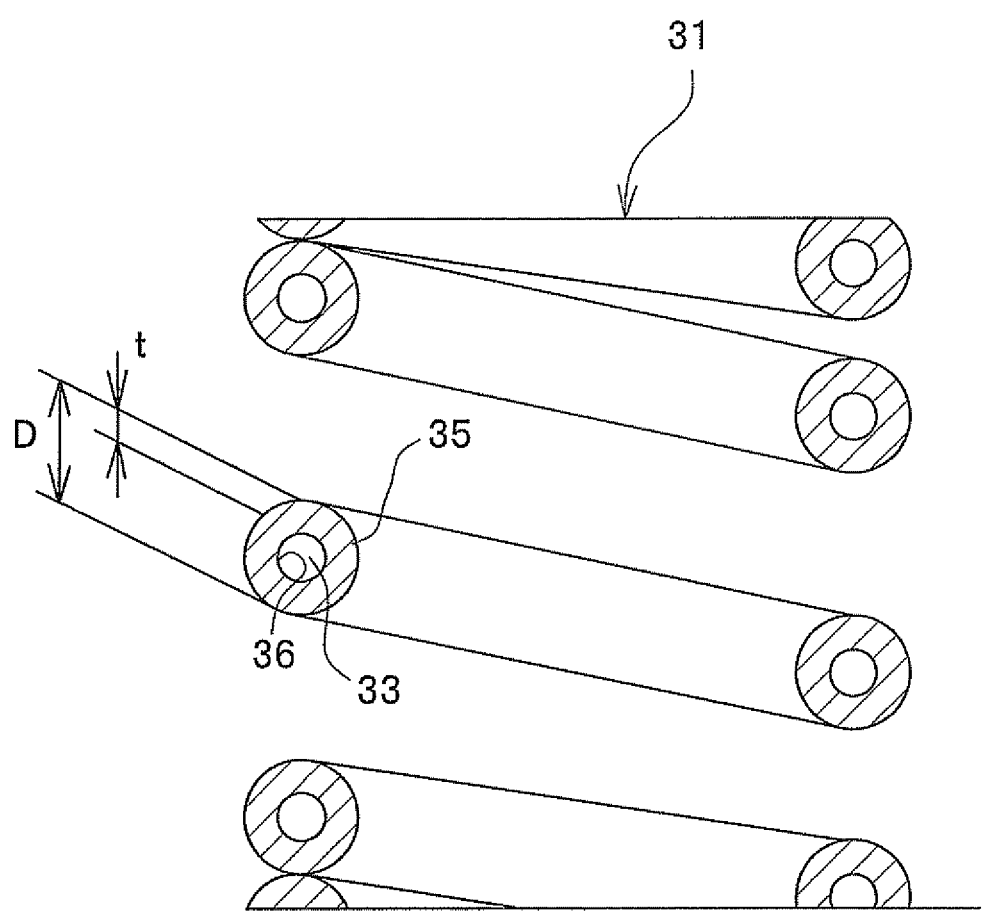
FIG. 2 is a cross sectional view of a hollow coiled spring according to one embodiment of the present invention.

FIG. 2 is a cross sectional view of a hollow coiled spring as a hollow spring according to one embodiment of the present invention. A hollow coiled spring 31, which is to be used as a suspension spring, a valve spring and the like for automobile, is obtained first as a seamless spring steel pipe with enhanced material cleanliness and surface properties by extruding a heated spring steel material with fluid pressure; and then as a coiled hollow body by coiling and applying a surface treatment to the seamless spring steel pipe so that the seamless spring steel pipe has compressive residual stress.

Figure 3:
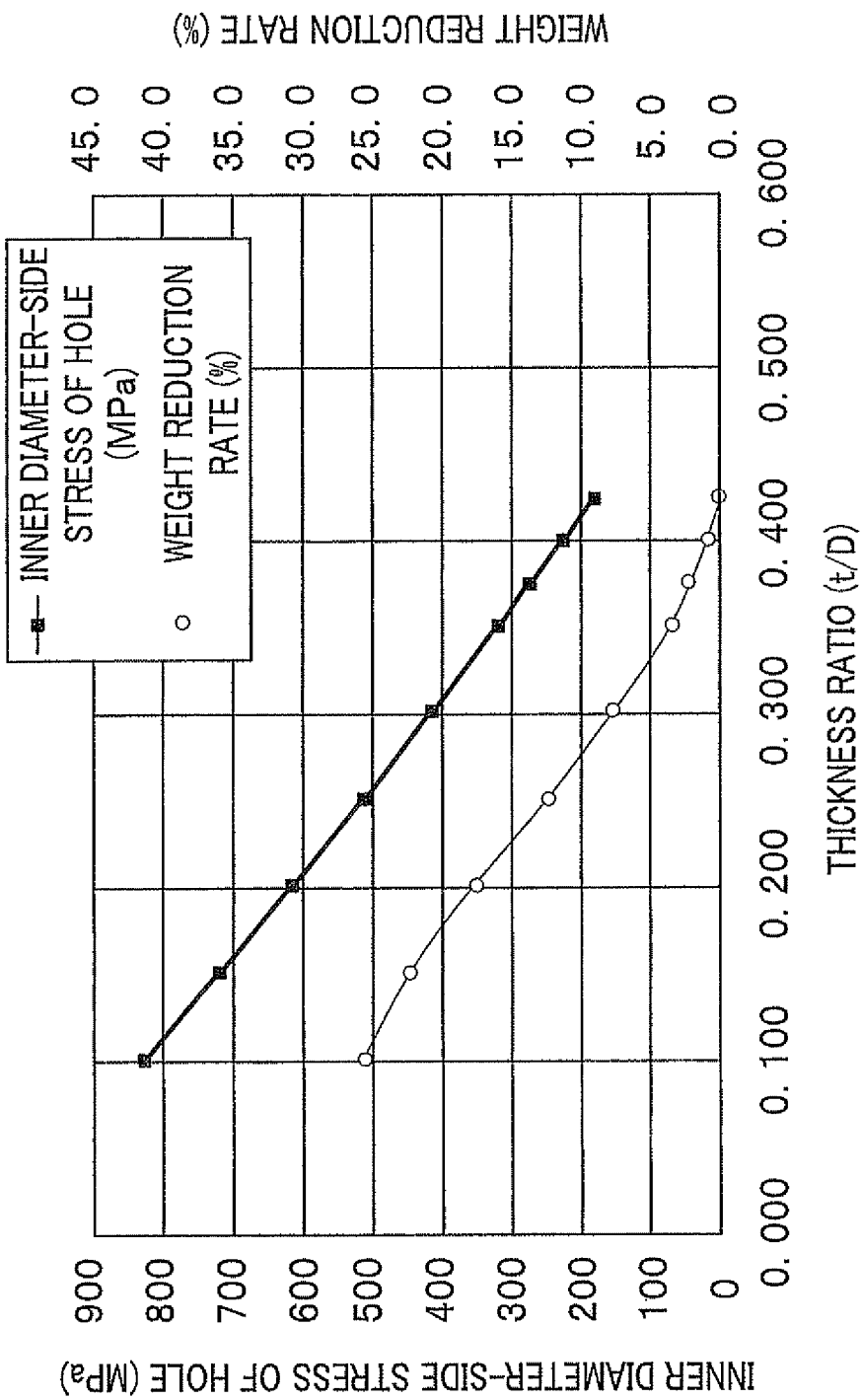
FIG. 3 is a graph showing relationships between t/D and weight reduction rate, and between t/D and hole stress.
Figure 4:
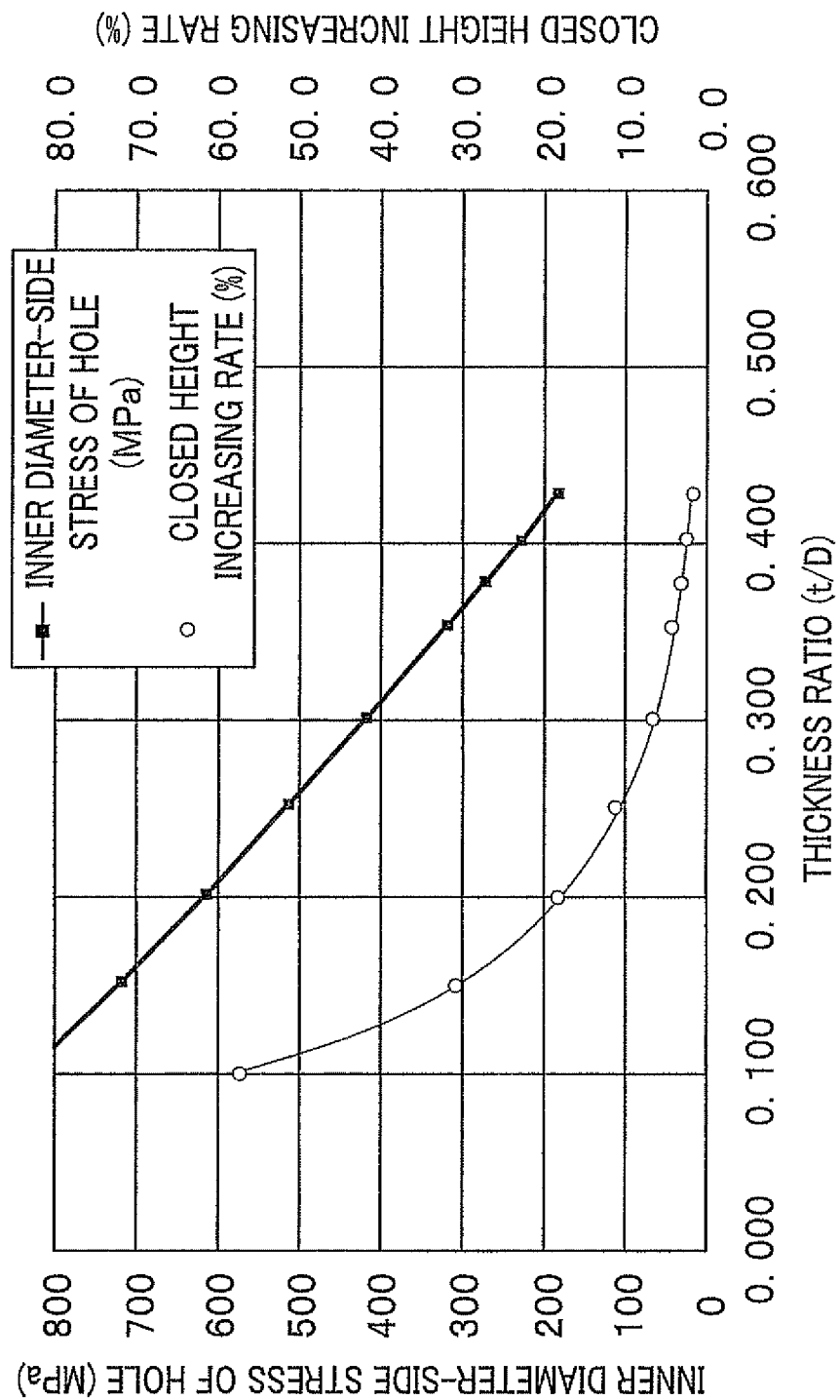
FIG. 4 is a graph showing relationship between t/D and closed height increasing rate, and between t/D and hole stress.

With respect to a cross section of the hollow body forming the hollow coiled spring 31, a ratio of a thickness t to an outer diameter D, t/D, was made 0.10 to 0.35, preferably 0.20 to 0.30. Table 1 shows relationships between t/D with weight reduction rate and the like. FIG. 3 is a graph showing relationships between t/D and weight reduction rate, and between t/D and hole stress. FIG. 4 is a graph showing relationship between t/D and closed height increasing rate, and between t/D and hole stress.

TABLE 1

| | Material diameter (mm) | t/D | Spring mass (g) | Weight reduction rate (%) | Inner diameter-side stress of hole (MPa) | Stress ratio hole/outer periphery surface | Closed height (mm) | Closed height increasing rate (%) |
|---|---|---|---|---|---|---|---|---|
| | 9.85 | 0.100 | 218 | 25.4 | 822 | 0.847 | 58.0 | 57.1 |
| | 8.87 | 0.150 | 227 | 22.4 | 717 | 0.739 | 48.2 | 30.6 |
| | 8.38 | 0.200 | 241 | 17.6 | 613 | 0.632 | 43.6 | 18.1 |
| | 8.11 | 0.250 | 255 | 12.5 | 512 | 0.528 | 41.0 | 11.1 |
| | 7.95 | 0.300 | 269 | 7.8 | 415 | 0.428 | 39.3 | 6.6 |
| | 7.87 | 0.350 | 282 | 3.4 | 319 | 0.329 | 38.5 | 4.3 |
| | 7.84 | 0.375 | 285 | 2.3 | 272 | 0.281 | 38.1 | 3.2 |
| | 7.82 | 0.400 | 289 | 0.9 | 226 | 0.233 | 37.8 | 2.5 |
| | 7.80 | 0.425 | 292 | 0.2 | 181 | 0.186 | 37.5 | 1.7 |
| solid-core | 7.76 | 0.500 | 292 | | | | 36.9 | |

As is apparent from Table 1 and FIGS. 3 and 4, when the t/D decreases and the weight reduction rate increases, an inner diameter-side stress of a hole 33 becomes relatively large (FIG. 3), and when the outer diameter D increases, the closed height also increases (FIG. 4). Therefore, it is important to raise weight reduction rate while suppressing closed height.

When a compressive residual stress is applied to an inner surface of the hole 33 of the hollow coiled spring 31, fatigue strength becomes 970 MPa and when not applied, fatigue strength becomes 600 MPa. Therefore, when a compressive residual stress is not applied to the inner surface of the hole 33 of the hollow coiled spring 31, as shown in Table 1, a setting of t/D=0.25 becomes a limit from a viewpoint of strength, and at this limit value, the weight become the smallest. When a compressive residual stress is applied to the inner surface of the hole 3 of the hollow coiled spring 31, a setting of t/D=0.10 becomes possible, which gives a smaller weight than that obtained under the setting of t/D=0.25. A setting of t/D=0.35 gives a larger weight than that obtained under the setting of t/D=0.25, though such a setting is within an acceptable range, since it is still lighter as compared with the conventional coiled springs.

Comprehensively taking these settings into consideration, an inflection point of the weight reduction rate is specified, and a setting range of t/D=0.10 to 0.35 is determined.

The above-mentioned hollow coiled spring 31 has a hardness Hv of 500 or more, and as shown in FIG. 2, an outer contour 35 (outer circumference) of the cross section and an inner contour 36 (inner circumference; the hole 33) of the cross section are arranged as concentric circles. In the hollow coiled spring 31, a relative position of the cross-sectional outer contour 35 and the cross-sectional inner contour 36 is determined based on settings of a coil diameter and a material hardness of the hollow body that forms the above-mentioned hollow coiled spring 31.

The hollow coiled spring 31 according to the present embodiment is obtained first as a seamless steel pipe with enhanced material cleanliness and surface properties by extruding a heated spring steel material with fluid pressure; and then as a coiled hollow body by coiling and applying a surface treatment to the seamless spring steel pipe so that the seamless spring steel pipe has compressive residual stress. In the resultant coiled spring, it becomes easy to apply uniform compressive residual stress, and a material strength of the hollow spring becomes high, which in turn suppresses permanent transformation (permanent set) and fracture of the spring even under high stress, and design stress can be made higher, to thereby obtain both weight reduction effect and raise of fatigue strength.

Figure 5:
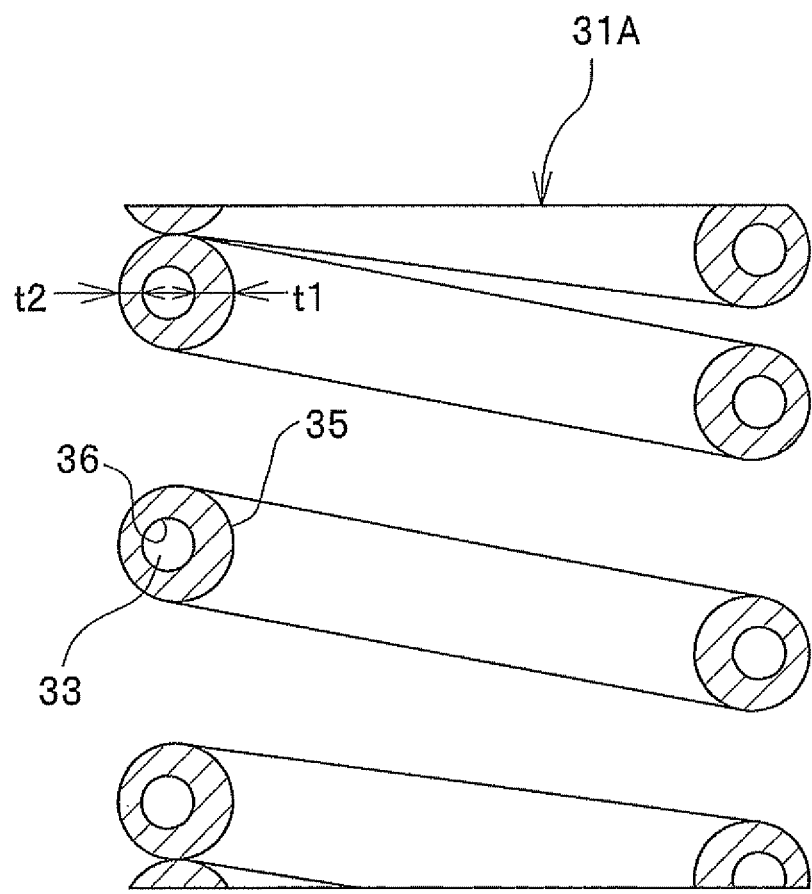
FIG. 5 is a cross sectional view of a hollow coiled spring according to another embodiment of the present invention.

FIG. 5 is a cross sectional view of a hollow coiled spring according to another embodiment of the present invention.

In a hollow coiled spring 31A of the present embodiment, a relative position of the cross-sectional inner contour 36 to the cross-sectional outer contour 35 is decentered to outside in a coil diameter direction of the hollow body forming the hollow coiled spring 31A. Therefore, a thickness t1 on an inner diameter-side of the hollow coiled spring 31A is relatively larger than a thickness t2 on an outer diameter-side.

In the hollow coiled spring 31A, relative positions of the cross-sectional outer contour 35 and the cross-sectional inner contour 36 were determined based on settings of a coil diameter and a material hardness of the hollow body that forms the above-mentioned hollow coiled spring 31A.

Therefore, in addition to the effects of the hollow coiled spring 31 of FIG. 2, the hollow coiled spring 31A of FIG. 5 enhances strength on the inner diameter-side where higher stress is applied relative to a stress on the outer diameter-side of the hollow coiled spring 31A, and thus exhibits improved endurance.

Figure 6:
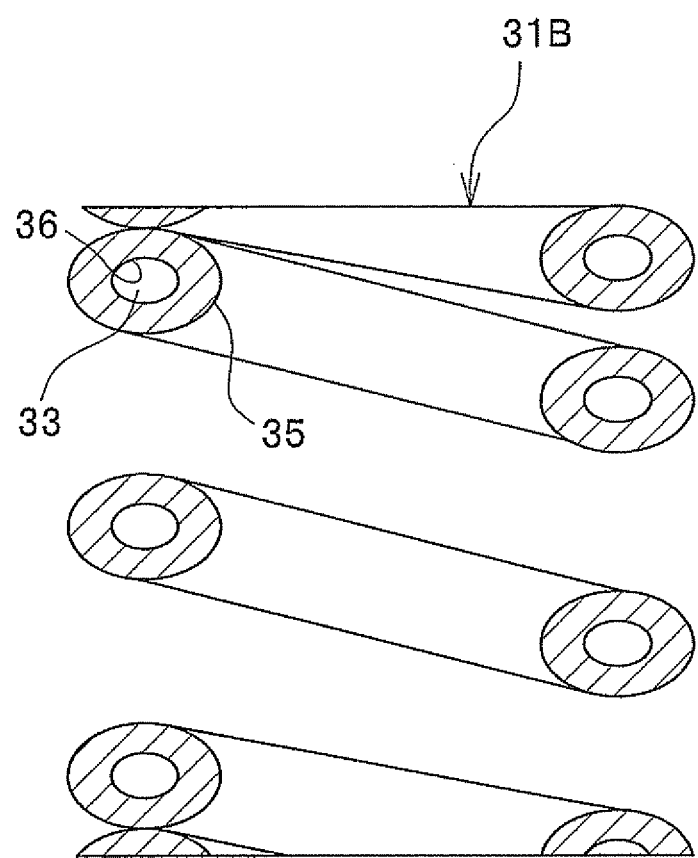
FIG. 6 is a cross sectional view of a hollow coiled spring according to still another embodiment of the present invention.

FIG. 6 is a cross sectional view of a hollow coiled spring according to still another embodiment of the present invention.

The hollow coiled spring 31B of the present embodiment has a cross-sectional outer contour 35 and a cross-sectional inner contour 36 each in a shape of an ellipsoid which is oblong in a perpendicular direction to an axle of the hollow body coil forming a hollow coiled spring 31B. The ellipsoids of the cross-sectional outer contour 35 and the cross-sectional inner contour 36 are concentric.

In the hollow coiled spring 31B, a relative position of the cross-sectional outer contour 35 and the cross-sectional inner contour 36 is determined based on settings of a coil diameter and a material hardness of the hollow body. The oblong cross-sectional shape is obtained by rolling treatment of the seamless spring steel pipe.

Therefore, in the hollow coiled spring 31B of the present embodiment, in addition to the effects of the hollow coiled spring 31 of FIG. 2, a height of the hollow coiled spring 31B can be suppressed, and stresses on the inner diameter-side and the outer diameter-side can be made even.

Figure 7:
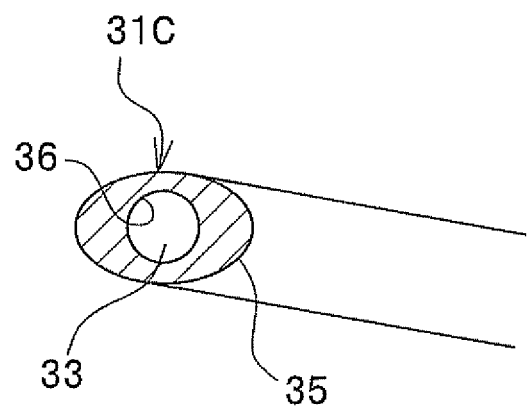
FIG. 7 shows sectional views of hollow coiled springs according to other embodiments of the present invention. Each of FIGS. 7 (a), (b) and (c) is a sectional view of a main part of the hollow coiled spring according to an embodiment of the present invention.
Figure 7:
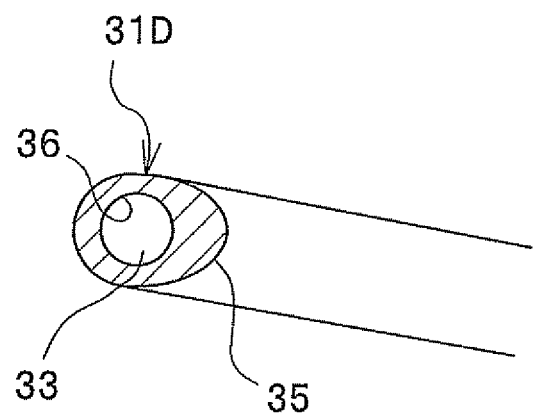
Figure 7:
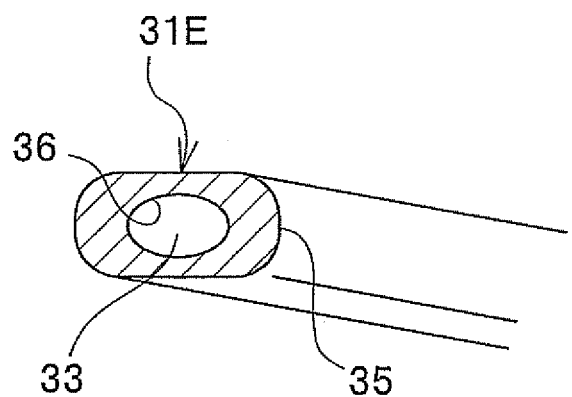

FIG. 7 shows sectional views of hollow coiled springs according to other embodiments of the present invention. Each of FIGS. 7 (*a*), (*b*) and (*c*) is a sectional view of a main part of the hollow coiled spring according to an embodiment of the present invention.

FIG. 7(*a*) shows a hollow coiled spring 31C having a cross-sectional outer contour 35 in a shape of a oblong ellipsoid, and a cross-sectional inner contour 36 in a shape of a perfect circle.

FIG. 7(*b*) shows a hollow coiled spring 31D having a cross-sectional outer contour 35 in a shape of an ovoid in which a curvature radius on a coil inner diameter-side is smaller, and a cross-sectional inner contour 36 in a shape of a perfect circle.

FIG. 7(*c*) shows a hollow coiled spring 31E having a cross-sectional outer contour 35 in a shape of basically an ellipsoid (or perfect circle) with flat sides on coil axle directions, and a cross-sectional inner contour 36 in a shape of ellipsoid (or ovoid). The cross-sectional outer contour 35 may be in a shape of rectangular.

The hollow springs according to the embodiments of the present invention include modified version of the hollow coiled spring 31B, 31C, 31D and 31E, in which at least the cross-sectional outer contour of the hollow body forming is not in a circular shape.

The present invention may be applied to a hollow stabilizer formed of a hollow body in a shape of a bar having curved parts. The hollow stabilizer has: a main body in a shape of a bar; arms on both ends of the main body; and curved parts that connect the main body and the arms. The present invention may be configured not as a coiled spring but also as a bar-shaped spring, such as a torsion bar without curved parts.

[3. Method for Producing Seamless Steel Pipe]

Next, a method for producing seamless steel pipe according to the present invention will be described.

Figure 8:
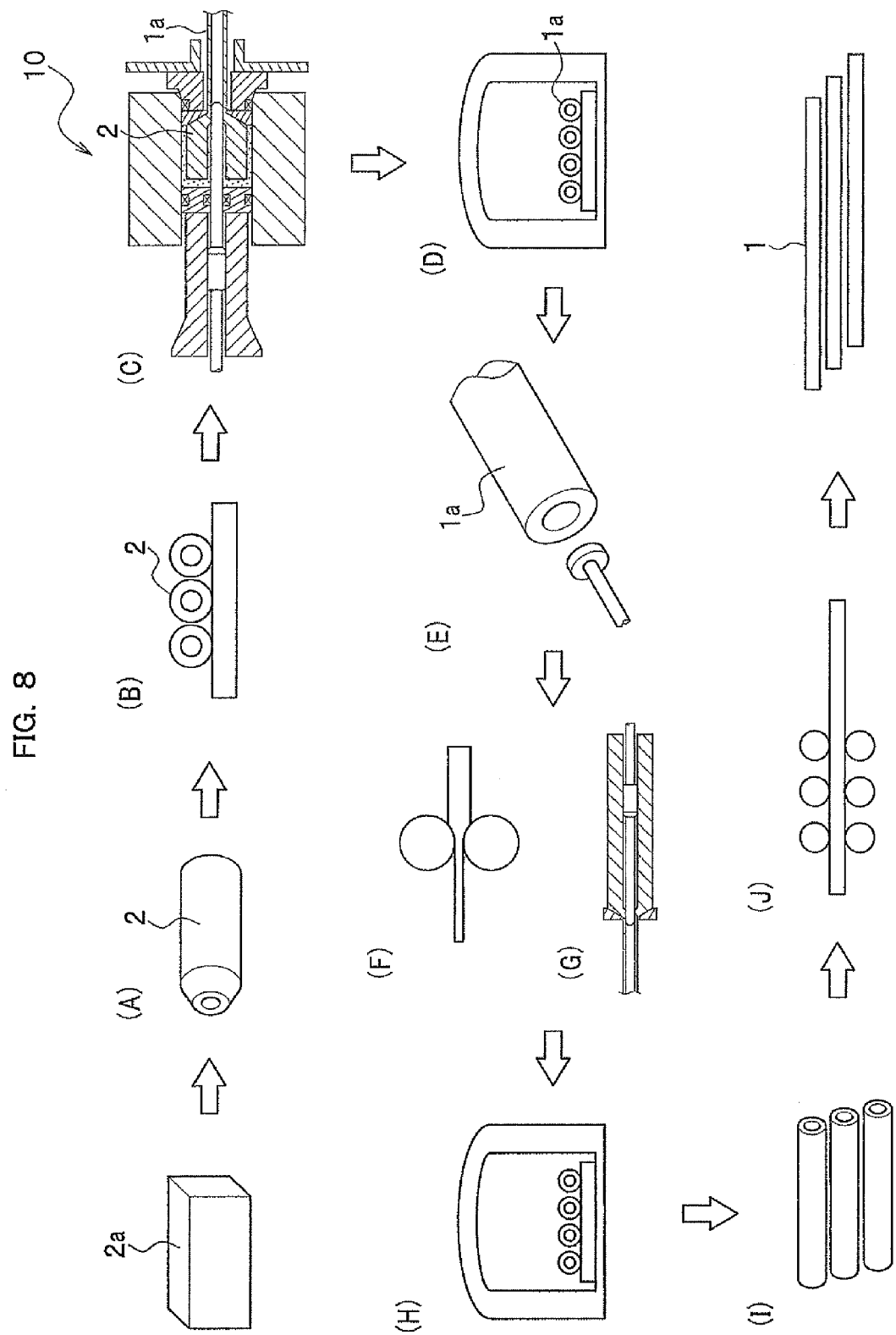
FIG. 8 is an explanatory diagram showing a flow of a preferable method for producing seamless steel pipe according to the present invention.

FIG. 8 is an explanatory diagram showing a flow of a preferable method for producing seamless steel pipe according to the present invention.

As shown in FIG. 8, the method for producing the seamless steel pipe 1 according to the present invention may include, for example, a billet molding step (FIG. 8(A)), a first heating step (FIG. 8(B)), a hot isostatic extrusion step (FIG. 8(C)), a second heating step (FIG. 8(D)), an extension step (FIGS. 8(F) and/or (G)), a third heating step (FIG. 8(H)) and a pickling step (FIG. 8(I)). The seamless steel pipe 1 as a product can be obtained by performing the steps which will be described in detail below.

It should be noted that, as shown in FIG. 8, the method for producing the seamless steel pipe according to the present invention preferably includes a bend straightening step (FIG. 8(J)) after the pickling step (FIG. 8(I)), and more preferably includes a grinding step (FIG. 8(E)) after the second heating step (FIG. 8(D)).

Next, each step of a preferable embodiment of the method for producing seamless steel pipe according to the present invention will be described in detail in the order of operation.

In the billet molding step (A), the steel material 2a is molded into a cylindrical billet 2 (hollow billet). Such a molding can be performed by forging and the like.

In the first heating step (B), the billet 2 is put in a heating furnace for performing heat treatment at 1,050° C. or more and less than 1,300° C., to thereby soften the billet 2. As the heating furnace, an electric furnace, a gas furnace and the like can be used. A heating time is not especially limited, as long as the billet 2 is sufficiently softened. The heating time may be appropriately changed depending on a size of the billet 2.

In the hot isostatic extrusion step (C), the billet 2 heated to 1,050° C. or more and less than 1,300° C. is subjected to hot isostatic extrusion processing using the hot isostatic extruder 10 described above, to thereby produce the seamless steel pipe workpiece 1a.

It should be noted that, in the hot isostatic extrusion step (C), the extrusion temperature of the billet 2 is preferably the same as the heating temperature in the first heating step (B), in other words, 1,050° C. or more and less than 1,300° C. From a viewpoint of number and size of inclusions in the steel that affects endurance of spring, the extrusion temperature is optimal at 1,100° C. or more and less than 1,280° C. However, taking damage on the tools into account, lower temperature has an advantage in that damage on the tools is reduced. Therefore, the recommended extrusion temperature range has a lower limit with somewhat lower bound, such as 1,050° C. or more and less than 1,200° C. When a product quality is considered more important, the range may be set as 1,100° C. or more and less than 1,200° C.

The following are the reasons for setting the extrusion temperature based on the number and size (maximum thickness) of non-metallic inclusion in the metallographic structure, per unit area. When the extrusion temperature rises, the non-metallic inclusions are softened, and fining of the non-metallic inclusions is promoted by deformation and shearing during extrusion. However, at the same time, crystallization accompanying with crystalline growth also proceeds, which gives concern that the non-metallic inclusions become bulky due to this crystallization at excessively high extrusion temperatures. On the other hand, in a case of a steel material (e.g. spring steel), it is recommended that a softening temperature of non-metallic inclusions be 1,100° C. or more and less than 1,280° C., and the extrusion temperature be made the softening temperature or more. In addition, effect of non-metallic inclusions being deformed and sheared due to deformation of metallographic structure depends on relative strength differential between the non-metallic inclusions and the metallographic structure. Therefore, when the extrusion temperature is excessively high and the strength of the metallographic structure decreases more than that of the softened non-metallic inclusions, fining effect is being lost as the crystallization proceeds. Accordingly, it is preferable that the extrusion temperature be a softening temperature or more of the non-metallic inclusions and still retained as low as possible.

On the other hand, a mold life during hot isostatic extrusion becomes shorter as the extrusion temperature becomes higher. Therefore, when a total cost is taken into consideration, lower extrusion temperature is preferred. Accordingly, the extrusion temperature is set lower by 50° C., in other words, 1,050° C. is made the lowest limit of the extrusion temperature. Lower extrusion temperatures than this are not suitable since adverse effect of non-metallic inclusions becomes notable and pushing stress becomes excessively large, leading to poor quality, increased load to equipments and the like.

Another feature of the hot isostatic extrusion processing lies in that, when the hot isostatic extrusion processing is performed in the above-mentioned specific temperature range, a surface condition of the seamless steel pipe workpiece 1a can be made smooth, since friction between the steel material and the tools of the hot isostatic extruder 10 is smaller as compared with the conventional extruder. As a result, for example, the surface of the seamless steel pipe workpiece 1a becomes glossy, the average roughness Ra can be made 50 μm or less, and crystal grains in the surface become smaller. Therefore, when the seamless steel pipe 1 produced from the same is processed into, for example, a coiled spring, stress becomes maximum at the outermost surface of a hollow spring. Accordingly, finer crystal grain, smaller surface roughness, and less surface defects (flaws, wrinkles and the like) leads to a longer operating life of the spring. In the hot isostatic extrusion step, during an extrusion processing, introduction of a lubricant prepared by adding graphite to oil reduces extrusion resistance, and extrusion molding of the seamless spring steel pipe can be smoothly performed. Therefore, the seamless steel pipe having less non-metallic inclusions and no surface roughness can be obtained.

In the second heating step (D), the seamless steel pipe workpiece 1a is heated in a heating furnace. The heating temperature is preferably 650 to 750° C. With respect to heating time, there is no limitation as long as a whole part of the seamless steel pipe workpiece 1a is heated. However, the heating time may preferably be 0.1 to 1 hour. When the heating temperature is lower than 650° C., or the heating time is less than 0.1 hour, the seamless steel pipe workpiece 1a may not be sufficiently heated, and thus grinding or extension in the next step may not be smoothly performed. On the other hand, the heating temperature exceeding 750° C. is not preferable, since the temperature reaches a quenching temperature. In addition, the heating time exceeding 1 hour is not preferable, since the heating effect reaches a saturation, leading to poor cost performance.

In the grinding step (E), at least an outer surface of the seamless steel pipe is ground, to thereby remove decarburizated portion and fine flaws on the surface, for improving surface properties. In the grinding step (E), both the outer surface and the inner surface may be ground. It should be noted that a size of grinding differs depending on types of steel material, conditions of the first heating step and the second heating step. Therefore, it is preferred that appropriate conditions be set based on experiments performed in advance.

In the extension step, the heated seamless steel pipe workpiece 1a is extended. Extension of the seamless steel pipe workpiece 1a can be performed by at least one of Pilger mill rolling (F) and drawing processing (G).

For example, the heated seamless steel pipe workpiece 1a may be extended by appropriate rolling through the drawing processing (G), and then stretching (drawing) using a die 11 through the Pilger mill rolling (F).

The Pilger mill rolling (F) is a processing in which the seamless steel pipe workpiece 1a is made more flattened by being pressed from both sides. Since this processing also stretches the seamless steel pipe workpiece 1a, the stretching processing in the next step can be omitted. In the Pilger mill rolling (F), the seamless steel pipe workpiece 1a is not simply rolled with being pressed from two sides, but can be rolled with being pressed evenly from 3, 4 or more sides, for example. With this processing, the seamless steel pipe workpiece 1a can be extended while retaining better circularity, and thus the drawing processing (G) can be aggressively made laborsaving.

It should be noted that if the Pilger mill rolling (F) is performed to an excessive degree, a steel thickness of the seamless steel pipe workpiece 1a in the circumferential direction may become uneven when stretched. From this point of view, the Pilger mill rolling (F) may be omitted. Repeated drawing processing (G) may be replaced with the rolling processing of the Pilger mill rolling (F). However, even in this case, it is preferable to retain circularity of the seamless steel pipe workpiece 1a with reduced cross-sectional area, by performing the stretching processing by the drawing processing (G) as the last step.

Next in the third heating step (H), annealing is performed by heating the seamless steel pipe workpiece 1a at 650 to 750° C. in order to avoid work hardening in the extended (stretched) seamless steel pipe workpiece 1a. The third heating temperature less than 650° C. is not preferable, since annealing becomes dissatisfactory. On the other hand, the third heating temperature exceeding 750° C. is not preferable, since the annealing effect reaches a saturation, leading to poor cost performance.

In the pickling step (I), the annealed seamless steel pipe workpiece 1a is pickled, to thereby remove oils (pressure medium 17) and scales that attach to the seamless steel pipe workpiece 1a.

Since the diameter is reduced only by 25% or less in one drawing processing (G), it is preferred that a seamless steel pipe workpiece 1a having a desired diameter be produced by performing process from the drawing processing (G), through the third heating step (H) to the pickling step (I), repeated for a certain times.

It is more preferable that, finally, bend be straightened in the bend straightening step (J), for producing the seamless steel pipe 1 as a product.

It should be noted that, in the method for producing seamless steel pipe of the present invention, a slow-cooling step (not shown) in which the heated seamless steel pipe workpiece 1a is slowly cooled may be performed, instead of the second heating step (D).

Generally, after hot isostatic extrusion, the seamless steel pipe workpiece 1a with a reduced diameter is exposed to air, and rapidly cooled down from the above-mentioned temperature range of 1,050° C. or more and less than 1,300° C. This quenching results in the seamless steel pipe workpiece 1a with extremely high hardness. With this hardness, various steps to be performed afterwards, such as the grinding step (E) and the extension step (Pilger mill rolling (F) and/or the drawing processing (G)), cannot be performed.

Therefore, first in the first heating step (C), the metallographic structure is changed into an austenite structure by heating, and then in the slow-cooling step (not shown), annealing is performed by slowly cooling the seamless steel pipe workpiece 1a.

As a result, residual stress is removed, the seamless steel pipe workpiece 1a is softened, cutting property is enhanced, and cold workability is improved. Therefore, for example, the extension step (drawing processing (G) and/or Pilger mill rolling (F)) may be performed without the second heating step. To sum up, there is a merit of reducing the number of production steps.

The slow-cooling may be performed with a thermal insulating machine in which temperature and slow-cooling speed are controlled, so that the hot isostatic extrusion is performed without rapidly cooling the seamless steel pipe workpiece 1a.

It is preferred that a slow-cooling rate be 0.1 to 0.3° C./sec. When the slow-cooling rate is more than 0.3° C./sec, annealing effect cannot be obtained from slow cooling. On the other hand, when the slow-cooling rate is below 0.1° C./sec, a time period required before the extension step becomes too long, leading to poor production efficiency.

According to the method for producing seamless steel pipe of the present invention, a steel raw material processed into a hollow billet is heated, softened and subjected to hot isostatic extrusion processing to thereby obtain a seamless pipe. Therefore, a seamless steel pipe having a small diameter (e.g. 30 to 60 mm) can be produced from a hollow billet having a large diameter. In addition, a cross-sectional area of the seamless steel pipe can be reduced (for example, by Pilger mill, drawing, or stretching) to the predetermined size. Moreover, unlike rolling, hydrostatic extrusion processing has smaller friction with tools, and therefore, the seamless pipe produced by the above-mentioned production method has glossy appearance and surface crystal grains become fine. As a result, the production step of the seamless spring steel pipe as a whole is simplified, which makes it possible to produce a hollow spring with high quality at a reduced cost, and in turn to use a hollow spring in a vehicle in a practice basis.

As explained above, according to the method for producing seamless steel pipe of the present invention, a high-quality seamless steel pipe with smooth outer periphery surface and inner periphery surface can be produced. In addition, unlike the conventional methods, such a seamless steel pipe can be produced without performing Mannesmann-piercing and mandrel mill rolling, leading to lessen labor and simplify steps up to completion of a product, and thus the seamless steel pipe can be produced at a reduced cost.

[4. Production Step of Hollow Coiled Spring]

Figure 9:
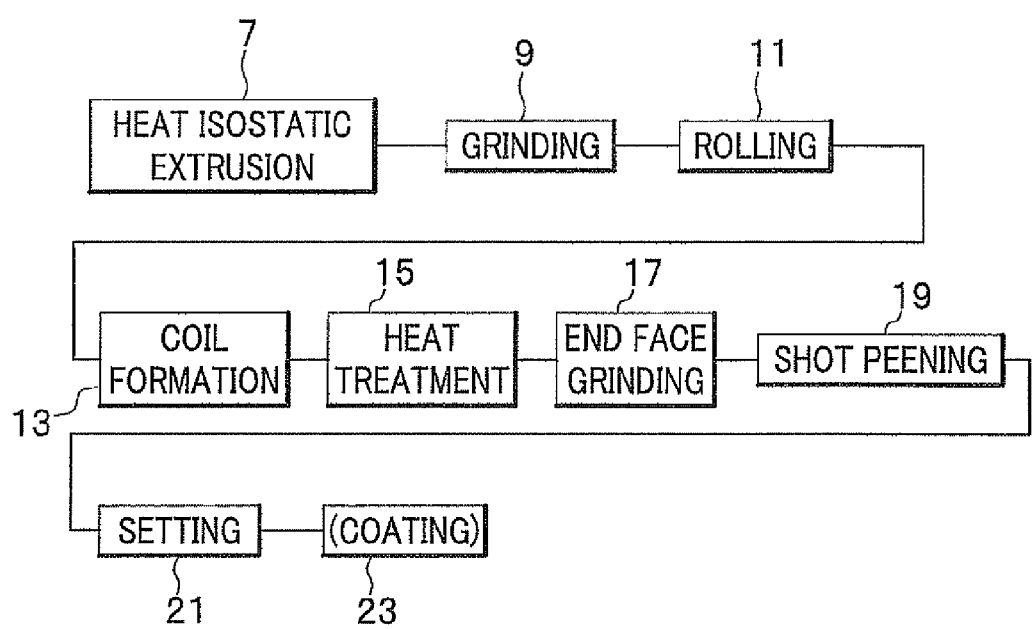
FIG. 9 is a block diagram showing a production process of a hollow coiled spring.

FIG. 9 is a block diagram showing a production process of a hollow coiled spring 31. As shown in FIG. 9, the hollow coiled spring 31 is obtained through a hot isostatic extrusion step 7, a grinding step 9, a rolling step 11, a coil forming step 13, a heat treatment step 15, an end face grinding step 17, a shot peening step 19, a setting step 21, and a coating step 23 in this order. The hot isostatic extrusion step 7 and the grinding step 9 in FIG. 9 correspond to the above-mentioned hot isostatic extrusion step (FIG. 8(C)) and the grinding step (FIG. 8(E)), the detailed steps from the hot isostatic extrusion step 7 to the grinding step 9 in FIG. 9 are substantially the same as the steps explained with respect to FIG. 8.

In the hot isostatic extrusion step 7 of FIG. 9, the seamless steel pipe 1a of FIG. 8 made of a spring steel material is heated and softened; hot isostatic extrusion processing is performed to thereby obtain a seamless steel pipe; and the cross-sectional area of the seamless steel pipe is reduced to a predetermined diameter. In other words, in the hot isostatic extrusion processing, molding is performed using the spring steel material in a fluid state, and therefore, a seamless pipe with an outer diameter of, for example, 30 to 60 mm is directly produced from a hollow billet with an outer diameter of, for example, 300 mm or more. It is preferable that the hot isostatic extrusion processing be performed while the above-mentioned spring steel material is heated to 1,050° C. or more and less than 1,300° C. With this configuration, the spring steel material is not in a molten state but in a softened state, which secures fluidability under ultrahigh pressure.

In the rolling step 11, the seamless spring steel pipe after grinding is stretched by rolling. Due to this rolling step 11, the processing amount in the next coil forming step 13 can be reduced.

In the coil forming step 13, a seamless spring steel pipe after rolling is formed into a hollow body in a shape of a coil.

In the heat treatment step 15, the hollow body in a shape of a coil is provided with elasticity as a spring by quenching and tempering heat treatment. In this step, it is also possible to provide the inner surface of the hole 3 with a compressive residual stress of approximately 100 MPa by performing nitriding treatment as surface treatment, after quenching and tempering heat treatment. Accordingly, in the present embodiment, together with a shot peening step 19 performed later, the outer surface of the hollow coiled spring 31 and the inner surface of the hole 3 undergo a surface treatment so that the outer and inner surfaces have compressive residual stress. It should be noted that rendering of compressive residual stress to the inner surface can be omitted.

In the heat treatment step 15, the inner surface of the hole 3 can be provided with a compressive residual stress of 200 MPa or less by carburization quenching and tempering heat treatment. Alternatively, the compressive residual stress may be applied by inner face shot peening, which will be described later, to the inner surface of the hole 3 after quenching and tempering heat treatment.

Further, compressive residual stress may be applied to the inner surface of the hole 3, by: applying an oil-temper treatment to the seamless spring steel pipe; forming a hollow body in a shape of a coil in the coil forming step 13; performing a heat treatment for removing distortion; and performing the quenching and tempering heat treatment plus nitriding treatment, or carburization quenching and tempering heat treatment, or quenching and tempering heat treatment plus inner face shot peening.

In the end face grinding step 17, an end face of the hollow body in a shape of a coil is ground to perform end face treatment.

In the shot peening step 19, hard fine grains are collided with the outer surface of the coiled hollow body, to thereby perform surface treatment which applies compressive residual stress to the outer surface.

Figure 10:
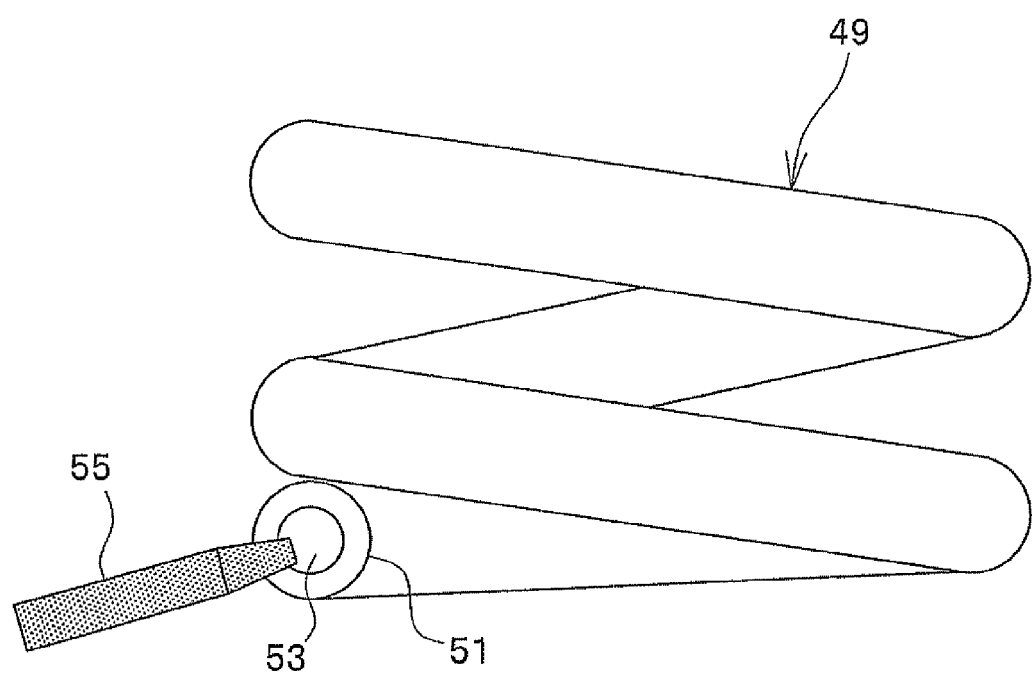
FIG. 10 is a conceptual diagram showing inner face shot peening of a hollow coiled spring according to the present invention.

FIG. 10 is a conceptual diagram showing inner face shot peening. As shown in FIG. 10, a shot nozzle 55 of a shot peening device utilizing air pressure is directed to a hole 53 of one end 51 of a hollow body 49 in a shape of a coil, and shot peening is performed. Subsequently, this shot peening is performed also from the other end of the hollow body 49. A diameter of a shot grain is made ⅓ or less of the diameter of the hole 53, to surely apply compressive residual stress to the hole 53.

In the setting step 21 compressed hollow body in a shape of a coil is released, and permanent transformation as a spring is prevented. In this step, similar shot peening effect to the above can be obtained on the inner face, by applying supersonic to the hole holding shot grains therein.

In the coating step 23, coating is performed if desired, to thereby obtain a coated hollow coiled spring 31.

For producing a hollow stabilizer, the coil forming step in the present embodiment is replaced with an arm forming step. A cross section of the curved part of the hollow stabilizer is designed in similar manner as in the hollow coiled springs 31, 31A and 31B, and the thickness is adjusted in a direction of curvature radius at the curved part. The entire part of the hollow stabilizer may have the oblong cross-sectional shape.

EXAMPLES

Example 1

[Weight Reduction Effect]

Table 2 shows a comparison between weight reduction effects of coiled spring. As shown in Table 2, coiled springs used were: a coiled spring (solid-core material) made of SiCr steel as solid-core material; a conventional hollow coiled springs (conventional hollow material) obtained using S45C or the like; and hollow coiled springs as example product made of SiCr steel or high-strength SiCrV steel, each having a coil inner diameter of φ 45 mm and an applied maximum load of 2750 N.

TABLE 2

Coil inner diameter: φ 45 mm
Applied maximum load: 2,750 N

| Material Used | Solid-core material | Conventional hollow material | Example product | |
|---|---|---|---|---|
| | SiCr steel | | SiCr steel | high-strength SiCrV steel |
| Hardness after quenching and tempering | Hv545 | Hv440 | Hv545 | Hv580 |
| TS (MPa) | 1,850 | 1,480 | 1,850 | 2,020 |
| Material diameter (mm) | 8.0 | 9.1 | 8.3 | 8.1 |
| Winding number | 5.46 | 7.1 | 5.75 | 5.39 |
| Thickness (mm) | — | 2.275 | 2.2 | 2.03 |
| Thickness ratio | — | 25% | 26.5% | 25% |
| Free height (mm) | 81 | 102 | 85 | 81 |
| Closed height (mm) | 41 | 62 | 45 | 41 |
| Inner diameter-side stress (MPa) Outside | 895 | 716 | 895 | 972 |
| TS ratio of outside stress | 48% | 48% | 48% | 48% |
| Hole side | — | 380 | 446 | 514 |
| Mass (g) | 336 | 439 | 298 | 255 |
| Characteristic frequency (Hz) | 293 | 242 | 306 | 337 |

As shown in Table 2, the conventional hollow coiled spring made of low-carbon steel exhibited hardness (Hv) of 440 and a tensile strength (TS) of 1,480 MPa after quenching. On the outer surface-side (outside) of the cross section, an inner diameter-side stress of coil was made 716 MPa and a TS ratio was made 48%, which gave a mass of 439 g.

On the other hand, in a case of example product made of SiCr steel, hardness (Hv) and tensile strength (TS) were 545 and 1,850 MPa, respectively, and in a case of example product made of high-strength SiCrV steel, hardness (Hv) and tensile strength (TS) were 580 and 2,020 MPa, respectively. When a TS ratio was made 48%, masses became 298 g and 255 g, and therefore winding number and the like can be lessened, and hollow coiled spring can be made more compact and lighter.

The performances are not inferior to those of solid-core material as shown in Table 2, and the weight is rather smaller.

Therefore, according to the hollow coiled spring of the present embodiment, weight reduction effect can be surely obtained, and characteristic frequency can be increased as shown in Table 2.

[Chemical Composition of High-Strength SiCrV Steel]

Table 3 shows examples of chemical composition of high-strength SiCrV steel. Both of a steel A and a steel B have been developed not as SiCr steel compliant with JIS standard, but vanadium (V) and the like are added thereto, to surly obtain the above-mentioned weight reduction effect as high-strength SiCrV steel. When a spring steel material is used for a valve spring, it is preferable to use the steel A shown in Table 3 and the like which is prepared with attention to cleanliness. Conditions of non-metallic inclusions in this case are also shown in Table 3.

TABLE 3

Chemical composition and non-metallic inclusions of high-strength SiCrV spring steel

| | Chemical composition (mass %) | | | | | | Non-metallic inclusion | |
|---|---|---|---|---|---|---|---|---|
| | C | Si | Mn | Ni | Cr | V | Maximum thickness (μm) | Number (/100 mm$^2$) |
| Steel A | 0.60 | 2.15 | 0.50 | 0.20 | 1.75 | 0.30 | 26 | 18 |
| Steel B | 0.62 | 2.00 | 0.90 | 0.30 | 1.00 | 0.10 | 18 | 14 |

Example 2

Next, the seamless steel pipe and the method for producing the same according to the present invention will be explained with reference to Examples which meet requirements of the present invention and Comparative Examples which do not meet requirements of the present invention, with making a comparison therebetween.

For Test No. 1 to 9, first, cylindrical billets were made of KHV10N (manufactured by Kobe Steel Ltd.) as steel material. The billets were formed so as to have the outer diameter of 143 mm and the inner diameter of 52 mm. The billets were heated at 950 to 1400° C. as shown in Table 1. Each of the heated billets for Test No. 1 to 9 was subjected to hot isostatic extrusion processing using a hot isostatic extruder at a corresponding temperature (extrusion temperature), to thereby produce a seamless steel pipe. Subsequently, the seamless steel pipes of Test No. 1 to 9 were subjected to spheroidizing annealing processing at 680° C. for 16 hours, and Pilger mill rolling and drawing processing were performed to extend the pipe to have an outer diameter of 10.6 mm and an inner diameter of 5.9 mm. The seamless steel pipes were heated at 700° C. for 0.5 hour and then pickled, to obtain the seamless steel pipes of Test No. 1 to 9.

As a pressure medium for the hot isostatic extrusion, a pressure medium was used including synthetic oil as a matrix, prepared by adding graphite to molybdenum disulfide-containing lubricating oil.

With respect to each of the thus obtained seamless steel pipes of Test No. 1 to 9, a maximum thickness (nm) and a number per unit area (number/100 mm$^2$) of non-metallic inclusion were measured, and extrudability and surface roughness were evaluated.

With respect to the non-metallic inclusion, the maximum thickness (nm) and the number per unit area (number/100 mm$^2$) were measured by observing a cross section with a scanning electron microscope.

In extrudability evaluation, the product with no problems in hot isostatic extrusion processing is indicated with "yes", and the product with which hot isostatic extrusion processing was not able to be smoothly conducted, such as extrusion resistance was extremely strong, is indicated with "N.G".

In surface roughness evaluation, the seamless steel pipes of Test No. 1 to 9 were visibly inspected. The product with no surface roughness is indicated with "None", and the product with surface roughness is indicated with "occurred".

The heating temperature conditions, measurement results and evaluations are shown in Table 4.

TABLE 4

| Test No. | Extrusion temperature (° C.) | Non-metallic inclusion | | Extrudability | Surface roughness | Note |
| | | Maximum thickness (μm) | Number (/100 mm$^2$) | | | |
| --- | --- | --- | --- | --- | --- | --- |
| 1 | 950 | — | — | N.G. | — | Comparative Example |
| 2 | 1,000 | 52 | 32 | Yes | None | Comparative Example |
| 3 | 1,050 | 24 | 18 | Yes | None | Example |
| 4 | 1,100 | 21 | 15 | Yes | None | Example |
| 5 | 1,200 | 30 | 19 | Yes | None | Example |
| 6 | 1,250 | 38 | 20 | Yes | None | Example |
| 7 | 1,300 | 58 | 52 | Yes | Occurred | Comparative Example |
| 8 | 1,350 | 64 | 42 | Yes | Occurred | Comparative Example |
| 9 | 1,400 | 62 | 46 | Yes | Occurred | Comparative Example |

As is apparent from Table 4, in the case of the product of Test No. 1 (950° C.), extrusion resistance was large, and it was impossible to perform hot isostatic extrusion (N.G).

In the case of Test No. 2 (1,000° C.), a maximum thickness of non-metallic inclusion in the seamless steel pipe was large (52 μm), and the number was large (32 inclusions/100 mm$^2$).

On the other hand, in the case of Test No. 7 to 9 with the extrusion temperatures of 1,300° C. or more, the maximum thickness of the non-metallic inclusion in the seamless steel pipe was large (58 μm or more), and the number of non-metallic inclusions was large (42 or more inclusions/100 mm$^2$) Surface roughness was also observed. Test No. 1, 2 and 7 to 9 are Comparative Examples.

In contrast, in the case of Test No. 3 to 6 with the extrusion temperatures of 1,050° C. or more and less than 1,300° C., the maximum thickness of the non-metallic inclusion was small (38 μm or less), and the number was small (20 or less inclusions/100 mm$^2$) No surface roughness was occurred. Test No. 3 to 6 are Examples.

Therefore, in order to enhance smoothness of the surface, it proves that the extrusion temperature of the billet during the hot isostatic extrusion step is preferably made 1,050° C. or more and less than 1,300° C. Especially, for example, when the seamless steel pipe is formed into a coiled spring and the like, it was found that the extrusion temperature is preferably made 1,050 to 1,250° C., in order to surely suppress the number and the size of non-metallic inclusions in the metallographic structure that affects endurance of coiled spring. Further, when damage of tools are taken into account, it is advantageous to perform extrusion at a lower temperature, and extrusion temperature is preferably made 1,050° C. or more and less than 1,200° C. When the quality is further concerned, it was found that the temperature is preferably made 1,100° C. or more and less than 1,200° C.

With this setting of the extrusion temperature, the surface of the seamless steel pipe can be made smooth.

Example 3

Next, coiled springs were produced from: the seamless steel pipes which meet requirements of the present invention; the seamless steel pipe which do not meet requirements of the present invention; and a solid-core steel material. For each spring, a fatigue test was conducted. It should be noted that the steel materials are the same as in <<Example 2>>.

First, seamless steel pipe was produced by hot isostatic extrusion at an extrusion temperature of 1,150° C., and then coiled springs (all hollowed product) of Test No. 10 and 11 each having an outer diameter of 76.0 mm, an inner diameter of 54.8 mm, a height of 153.5 mm, and a winding number of 6.76 were produced.

The coiled spring of Test No. 11 has surface flaw (artificial flaw corresponding to contiguous flaw), formed on the outer periphery surface and the inner periphery surface thereof.

The coiled spring of Test No. 11 was obtained by: forming a seamless steel pipe under the same conditions as those in Test No. 10; a surface flaw with a depth of more than 50 μm was formed on the seamless steel pipe by filing the outer periphery surface and sliding a reeler having rough surface over the inner periphery surface; and processing the seamless steel pipe into a coiled spring.

A coiled spring of Test No. 12 had non-metallic inclusions having a maximum thickness in a direction perpendicular to the pipe axis of more than 50 μm, in the metallographic structure.

For the coiled spring of Test No. 12, a seamless steel pipe was produced by hot isostatic extrusion processing at 1,350° C., and from this seamless steel pipe, a coiled spring (hollow product) having the above-mentioned properties was produced.

A coiled spring of Test No. 13 is a conventional solid-core coiled spring.

For the coiled spring of Test No. 13, a solid-core steel material was produced by hot isostatic extrusion in which the same solid-core billet as in Test No. 10 to 12 was used under the same conditions as in Test No. 10 to 12, except that a mandrel was not used; and from this steel material, a coiled spring (solid-core product) having an outer diameter of 76.0 mm, a height of 153.5 mm, and a winding number of 6.76 was produced.

For each of the coiled springs of Test No. 10 to 13, a fatigue test was conducted.

The fatigue test was performed as a fatigue test of single unit, in which action of extension and contraction was repeated a predetermined times (400,000 times).

With respect to the coiled spring in Test No. 10 to 13, depth of the surface flaw, size of non-metallic inclusions, and surface roughness (average roughness Ra) were measured with a scanning electron microscope.

The results are shown in Table 5.

TABLE 5

| Test No. | Surface flaw (exceeding 50 μm) Outer periphery | Surface flaw (exceeding 50 μm) Inner periphery | Non-metallic inclusion (exceeding 50 μm) | Average roughness Ra (μm) | Result of fatigue test of single unit | Note |
|---|---|---|---|---|---|---|
| 10 | None | None | None | 4 | No problem after 400,000 times | Example |
| 11 | Present | Present | None | 50 | Fracture from inner flaw after 200,000 times | Comparative Example |
| 12 | None | None | Present | 4 | Fracture from inside after 180,000 times | Comparative Example |
| 13 | None | — | None | 4 | No problem after 400,000 times | Comparative Example |

As is apparent from Table 5, the coiled spring of Test No. 10, which meets requirements of the present invention, did not have fractures after 400 thousand times of repeated action of extension and contraction, and an excellent result was obtained.

That is, the hollow coiled spring meeting the requirements of the present invention shows results equivalent to the solid-core coiled spring (Test No. 13).

On the other hand, the coiled springs of Test No. 11 and 12 do not meet some of requirements of the present invention and excellent results were not obtained, with the fracture from inside flaw or inner part after 180 to 200 thousand times of repeated action of extension and contraction.

Example 4

Endurance (represented as a repeated action number) of hollow coiled spring to be used as valve spring of automobile engine was examined. As a test material for the hollow coiled spring, the steel B in Table 3 was used, and hot isostatic extrusion was conducted using conditions A to E shown in Table 6. The results of the endurance test are shown in Table 7.

TABLE 6

| | | Non-metallic inclusion | |
|---|---|---|---|
| | Extrusion temperature (° C.) | Maximum thickness (μm) | Number (/100 mm$^2$) |
| A | 1,050 | 7 | 8 |
| B | 1,100 | 7 | 6 |
| C | 1,200 | 11 | 8 |
| D | 1,250 | 13 | 8 |
| E | 1,300 | 25 | 26 |

TABLE 7

Data of endurance test of hollow coiled spring
Outer maximum shearing stress: 950 MPa
Wire diameter: φ 5.6 mm
Hardness after heat treatment: Hv 620
Hole diameter: φ 2.8 mm (thickness 1.4 mm)

| Extrusion conditions | Endurance (×10$^4$ times) No. 1 | Endurance (×10$^4$ times) No. 2 | Position of fracture No. 1 | Position of fracture No. 2 |
|---|---|---|---|---|
| A | 3,000 | 3,000 | No fracture | No fracture |
| B | 3,000 | 3,000 | No fracture | No fracture |
| C | 3,000 | 3,000 | No fracture | No fracture |
| D | 1,020 | 1,290 | Inclusion | Inclusion |
| E | 945 | 1,090 | Inclusion | Hole surface |

The valve spring in Table 6 was processed and adjusted to have a wire diameter of φ 5.6 mm, a hole diameter of φ 2.8 mm (thickness of 1.4 mm), an outer maximum shearing stress of 950 MPa, and hardness after heat treatment (Hv) of 620. As is apparent from Table 7, under any of extrusion conditions A, B and C, no fracture occurred after 30 million times of repeated action, which exceeds way over 10 million times, i.e., an endurance number required for a valve spring.

Example 5

Endurance of hollow coiled spring to be used as suspension spring of automobile suspension was examined. As a test material for hollow coiled spring, the steel A in Table 3 was used, and hot isostatic extrusion was conducted under conditions of A to E shown in Table 6. The results of the endurance test are shown in Tables 8, 9 and 10 and FIG. 11.

TABLE 8

Data of endurance test of hollow coiled spring
Outer maximum shearing stress: 1,100 MPa
Wire diameter: φ 10.0 mm
Hardness after heat treatment: Hv 620
Hole diameter: φ 5.0 mm (thickness: 2.5 mm)

| Extrusion conditions | Endurance (×10$^4$ times) No. 1 | No. 2 | Position of fracture No. 1 | No. 2 |
|---|---|---|---|---|
| 2 | 50 | 50 | No fracture | No fracture |
| 3 | 50 | 50 | No fracture | No fracture |
| 4 | 50 | 50 | No fracture | No fracture |
| 5 | 50 | 50 | No fracture | No fracture |
| 6 | 50 | 50 | No fracture | No fracture |
| 7 | 38.5 | 45.9 | Surface roughness | Surface roughness |
| 8 | 25.3 | 28.3 | Outer surface flaw | Outer surface flaw |
| 9 | 15.4 | 11.2 | Hole surface flaw | Outer surface flaw |

TABLE 9

Data of endurance test of hollow coiled spring
Outer maximum shearing stress: 1,100 MPa
Wire diameter: φ 10.0 mm
Extrusion conditions E
Hole diameter: φ 5.0 mm (thickness: 2.5 mm)

| Hardness Hv after heat treatment | Endurance (×10$^4$ times) No. 1 | No. 2 | Position of fracture No. 1 | No. 2 |
|---|---|---|---|---|
| 450 | 0.59 | 0.65 | Outer surface | Outer surface |
| 480 | 1.45 | 1.88 | Outer surface | Outer surface |
| 505 | 19.8 | 21.5 | Outer surface | Outer surface |
| 535 | 25.2 | 28.6 | Outer surface | Outer surface |
| 580 | 40.7 | 47.2 | Hole surface | Hole surface |
| 620 | 50 | 50 | No fracture | No fracture |
| 660 | 50 | 50 | No fracture | No fracture |

TABLE 10

Data of endurance test of hollow coiled spring
Outer maximum shearing stress: 1,100 MPa
Wire diameter: φ 10.0 mm
Hardness after heat treatment: Hv 580
Hole diameter: φ 5.0 mm (thickness: 2.5 mm)

| | Residual stress of hole (MPa) | Endurance (×10$^4$ times) No. 1 | No. 2 | Position of fracture No. 1 | No. 2 |
|---|---|---|---|---|---|
| Base | +10 to +55 | 40.7 | 47.2 | Hole surface | Hole surface |
| Nitriding treatment | −70 to −130 | 50 | 50 | No fracture | No fracture |
| Carburization quenching | −20 to −80 | 50 | 50 | No fracture | No fracture |
| Shot peening | −300 to −520 | 50 | 50 | No fracture | No fracture |

The results of endurance test of suspension spring in Table 8 were obtained using a hollow coiled spring made of the steel A in Table 3 which was processed and adjusted to have a wire diameter of φ 10.0 mm, a hole diameter of φ 5.0 mm (thickness of 2.5 mm), an outer maximum shearing stress of 1,100 MPa, and hardness after heat treatment (Hv) of 620. Extrusion conditions 2 to 9 correspond to respective extrusion conditions 2 to 9 in Table 4. Under any of extrusion conditions 2, 3, 4, 5 and 6, no fracture occurred after 500,000 times of repeated action, which exceeds way over 200,000 to 300,000 times, i.e., an endurance number required for suspension spring.

Figure 11:
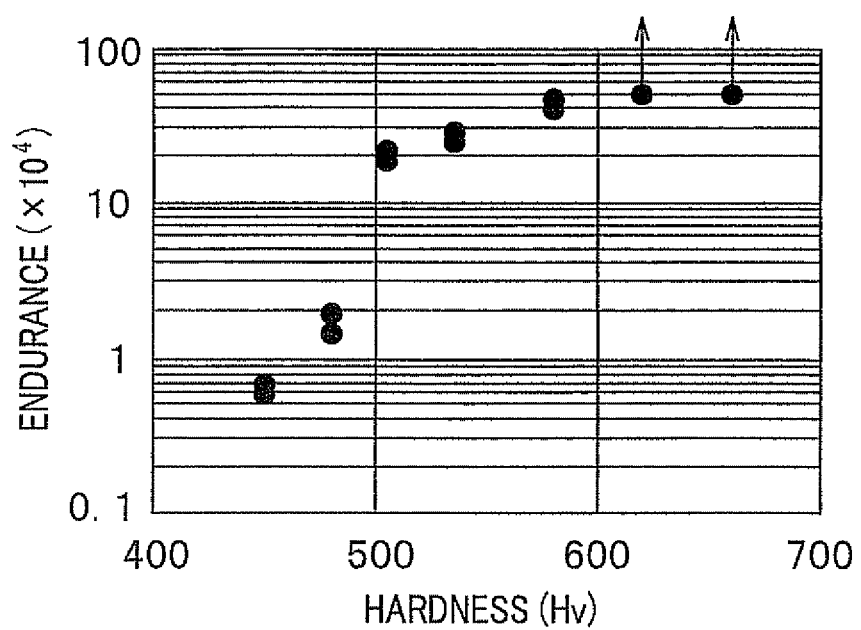
FIG. 11 is a graph in which results of endurance test regarding suspension spring in Table 9 are plotted.

The results of endurance test of the suspension spring in Table 9 were obtained using a hollow coiled spring formed of a seamless steel pipe made of the steel A in Table 3 at an extrusion temperature E in Table 6, the hollow coiled spring having the hardness altered by heat treatment. The hollow coiled spring to be tested was processed and adjusted to have a wire diameter of φ 10.0 mm, a hole diameter of φ 5.0 mm (thickness of 2.5 mm), and an outer maximum shearing stress of 1,100 MPa. FIG. 11 is a graph in which results of endurance test in Table 9 are plotted.

As is apparent from Table 9 and FIG. 11, at Hv 620 or more, there occurs no fracture after 500,000 times of repeated extension/contraction. In the case of a hollow coiled spring of Hv 480, fracture was observed on an outer surface after 14,500 times (1st operation), and 18,800 times (2nd operation). In the case of a hollow coiled spring of Hv 505, fracture was observed on an outer surface after 198,000 times (1st operation), and 215,000 times (2nd operation). In the case of a hollow coiled spring of Hv 535, fracture was observed on an outer surface after 252,000 times (1st operation), and 286,000 times (2nd operation). In the case of a hollow coiled spring of Hv 580, fracture was observed on a hole-side surface after 407,000 times (1st operation), and 472,000 times (2nd operation). Plotting of these data as shown in FIG. 11 indicates that there is an inflection point at Hv 500, and thus the hardness after heat treatment is preferably Hv 500 or more.

The results of endurance test of the suspension spring in Table 10 were obtained using a hollow coiled spring made of the steel A in Table 3 which was processed and adjusted to have a wire diameter of φ 10.0 mm, a hole diameter of φ 5.0 mm (thickness of 2.5 mm), an outer maximum shearing stress of 1,100 MPa, and hardness after heat treatment (Hv) of 580. As is apparent from Table 10, in a case of the base in which compressive residual stress is not applied to the inner surface of the hole of the hollow coiled spring, fracture was observed on the inner surface after 407,000 times (1st operation) and 472,000 times (2nd operation). On the other hand, when compressive residual stress is applied to the inner surface of the hole by nitriding treatment, carburization quenching and shot peening (inner face shot peening), no fracture occurred after 500,000 times of repeated action, which exceeds way over 200,000 to 300,000 times, i.e., an endurance number required for suspension spring.

Example 6

Table 11 shows results of a hollow stabilizer endurance test. The results were obtained using the steel A in Table 3 processed and adjusted to have a wire diameter of φ 25.0 mm, a hole diameter of φ 12.5 mm (thickness of 6.25 mm), an outer maximum principal stress of ±700 MPa, and a hole-side maximum principal stress of ±450 MPa.

TABLE 11

Data of endurance test of hollow stabilizer (torsion bar with arms)
Outer maximum principal stress: +/−700 MPa
Hole-side maximum principal stress: +/−450 MPa
Wire diameter: φ 25.0 mm
Hole diameter: φ 12.5 mm (thickness: 6.25 mm)

| | Hardness (Hv) | Endurance (×10⁴ times) No. 1 | No. 2 | Position of fracture No. 1 | No. 2 |
|---|---|---|---|---|---|
| Conventional S40C | 420 | 8.5 | 9.5 | Outer surface | Outer surface |
| Example product | 515 | 24.6 | 31.3 | Hole surface | Hole surface |
| Example product | 550 | 50 | 50 | No fracture | No fracture |
| Example product | 590 | 50 | 50 | No fracture | No fracture |

As is apparent from Table 11, the hollow stabilizer made of the conventional S40C has a hardness Hv 420, and fracture was observed on an outer surface after 85,000 times (1st operation) and 95,000 times (2nd operation). In the hollow stabilizer of the present Example, of hardness Hv 515, fracture was observed on an inner surface of the hole (surface of the hole) after 246,000 times (1st operation) and 313,000 (2nd operation), which is approximately 3 times of a duration life as compared with the conventional product. Further, for both hollow stabilizers of hardness Hv 550 and Hv 590, no fracture was observed after 500,000 times of repetition.

Therefore, in a case of the hollow stabilizer, similar effect to that of Example 1 can be obtained.

The seamless steel pipe and the method for producing the same have been described in detail above, with referring to best modes and Examples. However, the present invention is not limited to the particular embodiments described above, and should be construed based on the scope of the claims. The present invention may be carried out in various modified forms without departing from the spirit and the scope of the present invention.

For example, instead of the pressure medium 17 used in hot isostatic extrusion processing, glass powder may be used and thus hot glass-lubricating extrusion processing may be performed.

As a suitable embodiment of the seamless steel pipe of the present invention, descriptions were made with illustrating coiled spring and the like. However, the present invention can be used as: a hollow spring material having a squared U-shape, such as a stabilizer; a hollow bar material, such as drive shaft; and a frame material for buildings or bicycles.

The invention claimed is:

1. A method for producing seamless steel pipe comprising:
    a billet molding step in which a steel material is molded into a cylindrical billet;
    a first heating step in which the billet is heated;
    a hot isostatic extrusion step in which the heated billet is subjected to hot isostatic extrusion processing performed at 1,050° C. or more and less than 1,300° C. to obtain a seamless steel pipe workpiece;
    an extension step in which the heated seamless steel pipe workpiece is extended by at least one of Pilger mill rolling and drawing processing;
    a third heating step in which the extended seamless steel pipe workpiece is heated; and
    a pickling step in which the extended and heated seamless steel pipe workpiece is pickled; wherein
    a second heating step is not performed between the hot isostatic extrusion step and the extension step.

2. The method according to claim 1, further comprising a straightening step in which bend of the pickled seamless steel pipe is straightened, after the pickling step.

3. The method according to claim 1, further comprising a grinding step in which an inner periphery surface of the heated seamless steel pipe workpiece is ground.

4. The method according to claim 2, wherein an inner periphery surface of the seamless steel pipe is ground after the straightening step.

5. The method according to claim 1, wherein the first heating step includes heating the billet at 1,050° C. or more and less than 1,300° C.

6. The method according to claim 1, wherein the extension step, the third heating step, and the pickling step are repeated a predetermined number of times.

7. The method according to claim 1, wherein the hot isostatic extrusion processing performed at 1,100° C. or more and less than 1,200° C.

8. The method according to claim 1, wherein the extension step includes:
    extending the seamless steel pipe workpiece by drawing processing; and thereafter,
    stretching the seamless steel pipe workpiece using a die through the Pilger mill rolling.

9. The method according to claim 1, wherein the extension step includes extending the seamless steel pipe workpiece 25% or less in one pass.

10. The method according to claim 1, wherein the third heating step includes heating the seamless steel pipe workpiece to 650 to 750° C.

11. A method for producing seamless steel pipe comprising:
    a billet molding step in which a steel material is molded into a cylindrical billet;
    a first heating step in which the billet is heated;
    a hot isostatic extrusion step in which the heated billet is subjected to hot isostatic extrusion processing performed at 1,050° C. or more and less than 1,300° C. to obtain a seamless steel pipe workpiece;
    a slow-cooling step in which the seamless steel pipe workpiece that has been subjected to the hot isostatic extrusion processing is slowly cooled at a rate of 0.1° C./sec or more and less than 0.3° C./sec;
    an extension step in which the heated seamless steel pipe workpiece is extended by at least one of Pilger mill rolling and drawing processing;
    a third heating step in which the extended seamless steel pipe workpiece is heated; and
    a pickling step in which the extended and heated seamless steel pipe workpiece is pickled; wherein
    a second heating step is not performed between the hot isostatic extrusion step and the extension step.

12. The method according to claim 11, wherein the hot isostatic extrusion step includes placing the heated billet into a container and pressing the heated billet by a sealing piston through a pressure medium.

13. The method according to claim 12, wherein the pressure medium comprises a viscoplastic pressure medium.

* * * * *